US006963420B1

(12) United States Patent
Kawamoto et al.

(10) Patent No.: US 6,963,420 B1
(45) Date of Patent: Nov. 8, 2005

(54) IMAGE PROCESSING APPARATUS

(75) Inventors: Hiroyuki Kawamoto, Tokyo (JP);
Yasuyuki Nomizu, Tokyo (JP);
Yoshiyuki Namizuka, Tokyo (JP);
Hideto Miyazaki, Tokyo (JP); Shinya Miyazaki, Tokyo (JP); Yuji Takahashi, Tokyo (JP); Takako Satoh, Tokyo (JP);
Takeharu Tone, Tokyo (JP); Fumio Yoshizawa, Tokyo (JP); Hiroaki Fukuda, Tokyo (JP); Rie Ishii, Tokyo (JP); Sugitaka Oteki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 923 days.

(21) Appl. No.: 09/693,987

(22) Filed: Oct. 23, 2000

(30) Foreign Application Priority Data

Oct. 27, 1999 (JP) .................................. 11-306014

(51) Int. Cl.[7] ............................................. G06F 15/00
(52) U.S. Cl. ..................... 358/1.16; 358/448; 358/474; 358/444; 358/404
(58) Field of Search .............................. 358/1.16, 448, 358/474, 444, 404; 382/304, 307; 712/11; 345/418

(56) References Cited

U.S. PATENT DOCUMENTS

| | | | |
|---|---|---|---|
| 5,050,221 A | | 9/1991 | Ohta et al. |
| 5,253,308 A | * | 10/1993 | Johnson ....................... 382/304 |
| 5,410,619 A | | 4/1995 | Fujisawa et al. |
| 5,606,707 A | * | 2/1997 | Tomassi et al. ............. 345/418 |
| 6,041,139 A | | 3/2000 | Okubo et al. |
| 6,151,457 A | | 11/2000 | Kawamoto |

FOREIGN PATENT DOCUMENTS

JP    5-20283    1/1993

OTHER PUBLICATIONS

U.S. Appl. No. 07/939,935, filed Sep. 2, 1992.
U.S. Appl. No. 09/024,290, filed Feb. 17, 1997.
U.S. Appl. No. 09/122,108, filed Jul. 24, 1998.
U.S. Appl. No. 09/161,225, filed Sep. 28, 1998
U.S. Appl. No. 09/266,800, filed Mar. 12, 1999.
U.S. Appl. No. 09/262,317, filed Mar. 4, 1999.
U.S. Appl. No. 09/348,631, filed Jul. 6, 1999.
U.S. Appl. No. 09/437,088, filed Nov. 9, 1999.
U.S. Appl. No. 09/443,889, filed Nov. 19, 1999.
U.S. Appl. No. 09/468,954, filed Dec. 22, 1999.
U.S. Appl. No. 09/484,254, filed Jan. 18, 2000.
U.S. Appl. No. 10/360,749, filed Feb. 10, 2003, Namizuka.
U.S. Appl. No. 09/693,987, filed Oct. 23, 2000, Kawamoto et al.
U.S. Appl. No. 10/393,945, filed Mar. 24, 2003, Namizuka.

(Continued)

*Primary Examiner*—Twyler Lamb
(74) *Attorney, Agent, or Firm*—Oblon, Spivak, McClelland, Maier & Neustadt, P.C.

(57) ABSTRACT

The image processing apparatus comprises an input I/F memory which reads pixels having a predetermined length, subjects the read pixels to buffering, and writes them in a SIMD type processor. The SIMD type processor performs batch processing of the pixels. Further, an output I/F memory reads the pixels batch-processed by the SIMD type processor, subjects the read pixels to buffering and writes them in a predetermined output destination. Read and/or write timing of IN_FIFO and OUT_FIFO is appropriately controlled.

8 Claims, 17 Drawing Sheets

OTHER PUBLICATIONS

U.S. Appl. No. 10/632,957, filed Aug. 4, 2003, Namizuka.
U.S. Appl. No. 10/641,049, filed Aug. 15, 2003, Nomizu.
U.S. Appl. No. 10/663,804, filed Sep. 17, 2003, Togami et al.
U.S. Appl. No. 10/687,625, filed Oct. 20, 2003, Kawamoto et al.
U.S. Appl. No. 10/668,360, filed Sep. 24, 2003, Ohyama et al.
U.S. Appl. No. 10/663,784, filed Sep. 17, 2003, Shirata et al.
U.S. Appl. No. 10/797,129, filed Mar. 11, 2004, Nomizu.
U.S. Appl. No. 10/805,184, filed Mar. 22, 2004, Namizuka.

* cited by examiner

|  | j-2 | j-1 | j | j+1 | j+2 |
|---|---|---|---|---|---|
| i-2 | A | B | C | D | E |
| i-1 | F | G | H | I | J |
| i | K | L | M | N | O |
| i+1 | P | Q | R | S | T |
| i+2 | U | V | W | X | Y |

COLUMN / ROW

IMAGE PROCESSING APPARATUS

FIELD OF THE INVENTION

The present invention in general relates to an image processing apparatus which performs image processing with respect to digital image data. More specifically, this invention relates to an image processing apparatus which performs image processing with respect to image data in a digital compound machine which compounds functions of copying machine, fax machine, printer, scanner etc.

BACKGROUND OF THE INVENTION

Analog image processing apparatuses were popular a few years ago. However, due to recent improvement of technology and demands for displaying color images, digital copying machines are widely used along with the conventional analog image processing apparatus.

Furthermore, copying machines dedicated for copying documents, facsimile machines dedicated for sending and receiving facsimile, scanners dedicated for scanning documents, printers dedicated for printing the documents were also know. However, recently, so-called digital compound machines have come into market. These digital compound machines have the functions of a copying machine, a facsimile machine, a scanner, a printer etc.

FIG. 18 is a block diagram that shows a hardware configuration of a conventional digital compound machine.

This digital compound machine has realizes respective functions by connecting a portion constituting a copying machine (a copying machine portion) formed of a digital read unit 2201 for reading image data, an image processing unit 2202 for processing the read image data, a video control section 2203 for performing various controls with respect to the image data, a series of each component in a write unit 2204 for outputting the processed image data onto a recording medium, a memory control unit 2205 for controlling holding of the image data and a memory module 2206 for holding the image data with units such as a facsimile control unit 2212 for additionally controlling facsimile transfer via a mother board 2211, a printer control unit 2213 for performing input control of image data transmitted from an externally connected personal computer, and a scanner control unit 2214 for performing input/output control of image data when being used as a scanner.

Accordingly, as for the copying machine portion for realizing a function as a copying machine, a series of operations of respective components of the read unit 2201, image processing unit 2202, video control unit 2203 and write unit 2204 are controlled by a system controller 2207, RAM 2208 and ROM 2209, and respective units of the facsimile control unit 2212, printer control unit 2213 and scanner control unit 2214 utilize a part of the series of operations established by the copying machine, to thereby realize functions of respective units.

In other words, the functions of the digital compound machine are realized by adding on the facsimile control unit 2212, printer control unit 2213 and scanner control unit 2214 to the copying machine portion which has been established as one system comprising the above-described series of components. This is based on a background that the processing speed is given priority (speed-up of the processing is contemplated) by constituting the above-described series of components of hardware such as ASIC (Application Specific Integrated Circuit).

Particularly, in Japanese Unexamined Patent Publication No. H5-20283, "Parallel data processing apparatus", there is disclosed a technique related to a parallel data processing apparatus including a SIMD (Single Instruction Multiple Data stream) type parallel data processing apparatus and a MIMD (Multiple Instruction Multiple Data stream) type parallel data processing apparatus.

According to this parallel data processing apparatus, improvement of the processing speed is contemplated by performing the SIMD type parallel data processing with regard to regular processing (shading correction processing, scanner γ-correction processing, or the like), and performing the MIMD type parallel data processing with regard to irregular processing (error diffusion processing), via a switching control.

Therefore, it is possible to contemplate speed-up of the image processing by applying this parallel data processing apparatus to the read unit 2201, facsimile control unit 2212, printer control unit 2213, scanner control unit 2214 and image processing unit 2202.

However, in the conventional digital compound machine, since the copying machine portion has been established as one system, the respective units connected to the copying machine portion, such as the facsimile control unit 2212, the printer control unit 2213 and the scanner control unit 2214 must be built up as a system, respectively independently of the copying machine portion, in order to realize respective functions.

This means that it is necessary to constitute respective units as well as the image processing unit 2202 so as to include ASIC (not shown in FIG. 18) required for realizing the image processing function, respectively, causing a problem in that resources are not effectively utilized.

Moreover, even if overlapping of respective units is eliminated, and an efficient digital compound machine is formed so that image processing is performed by only the image processing unit, there is still a problem as described below. Consider, for example, a case where a read unit or a write unit of 400 dpi is to be upgraded to the one of 600 dpi. Improvement of the overall function of the apparatus cannot be easily effectuated only by replacing the unit under consideration.

Specifically, since the whole system is built so as to read/written at 400 dpi, it is necessary to redesign the image processing processor in the unit so that read/write at 600 dpi can be performed.

This is because when-image processing (error diffusion processing or the like) which is required to be performed referring to pixels around the target pixel is performed, the maximum pixel that can be handled by one processor is limited by a line memory in the image processing processor, while there is a demand for high-speed image processing using the SIMD type processor with parallel calculation.

Accordingly, there is a problem in that while most resources within the image processing processor are common, it is necessary to modify a chip due to a reason that the size of the internal memory capacity is relatively insufficient, and hence the development efficiency decreases, and the image processing processor cannot be effectively utilized.

SUMMARY OF THE INVENTION

It is an object of the present invention to provide an image processing apparatus which can perform high-speed image processing by effectively utilizing an image processing processor, even in a case where the memory capacity of the image processing unit (image processing processor) is relatively insufficient, in order to solve the above-described problems in the related art.

In the image processing apparatus according to one aspect of this invention, a control unit is provided which controls the read and/or write timing of an input I/F memory and an output I/F memory. Accordingly, overlapped pixels can be processed by the SIMD type processor.

In the image processing apparatus according to another aspect of this invention, a control unit is provided which controls read and/or write timing of an input I/F memory and an output I/F memory. Accordingly, overlapped pixels can be processed at a higher speed by the SIMD type processor.

In the image processing apparatus according to still another aspect of this invention, a control unit is provided which controls write and/or read speed with respect an input I/F memory, and write and/or read timing with respect the input I/F memory based on the speed and the capacity of the input I/F memory, and/or the write and/or read speed with respect an output I/F memory, and the write and/or read timing with respect the output I/F memory based on the speed and the capacity of the output I/F memory. Accordingly, the overlapped pixels can be most efficiently processed by the SIMD type processor, while taking into consideration the capacity of the input I/F memory and the output I/F memory.

Other objects and features of this invention will become apparent from the following description with reference to the accompanying drawings.

DESCRIPTION OF THE PREFERRED EMBODIMENTS

Five preferred embodiments of the image processing apparatus according to the present invention will now be described in detail, with reference to the accompanying drawings.

Figure 1:
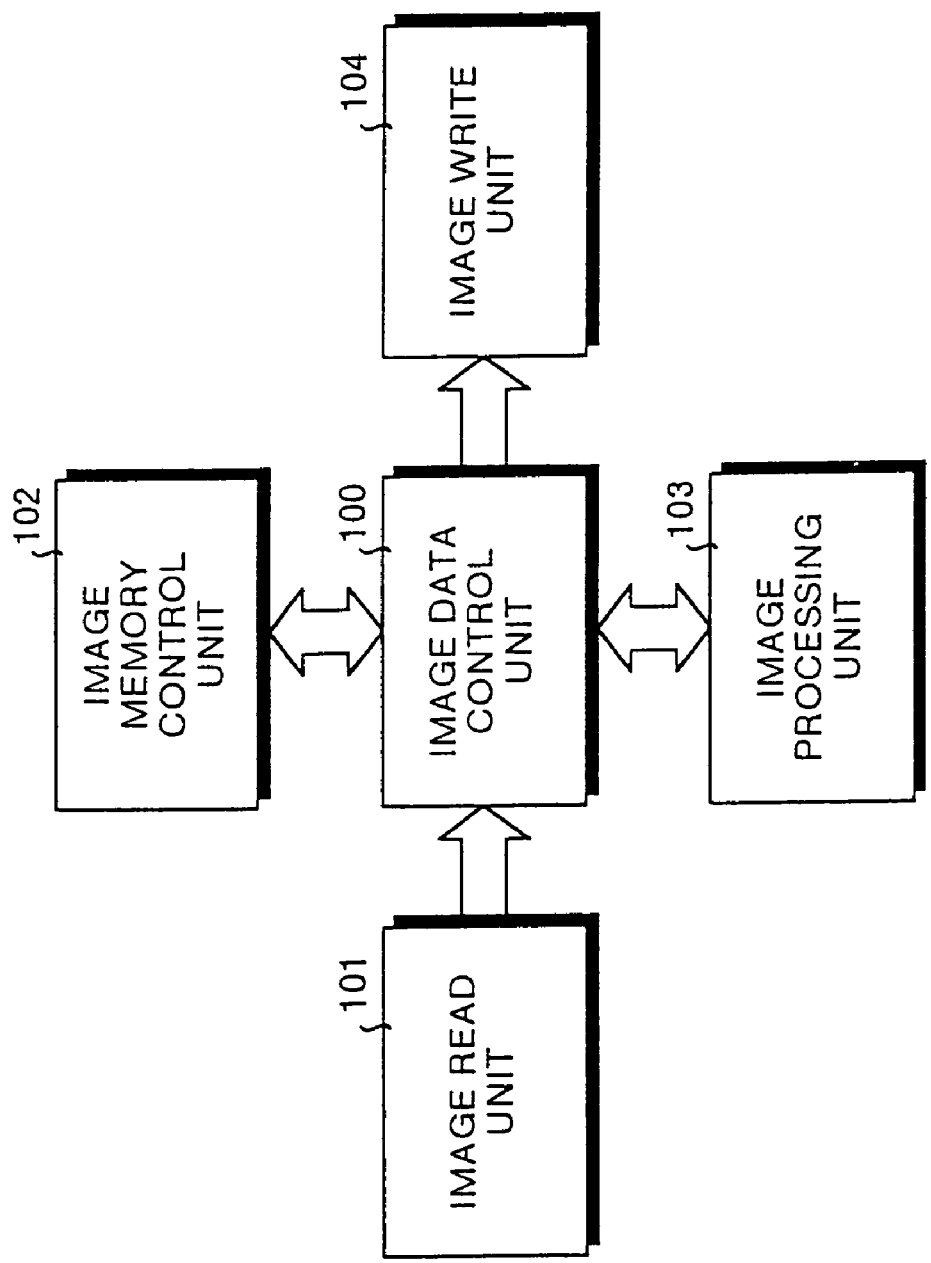
FIG. 1 is a block diagram which functionally shows the construction of an image processing apparatus according to a first embodiment.

At first, the principle of the image processing apparatus according to a first embodiment will be described. FIG. 1 is a block diagram functionally showing the construction of the image processing apparatus according to the first embodiment of the present invention. This image processing apparatus has five units as explained below.

That is, this image processing apparatus has an image data control unit 100, an image read unit 101 for reading image data, an image memory control unit 102 for controlling an image memory for storing images to perform write/read of image data, an image processing unit 103 for subjecting the image data to image processing such as processing/editing, and an image write unit 104 for writing the image data on a transfer paper or the like.

Each of the above-described unit is connected to the image data control unit 100. That is, the image read unit 101, the image memory control unit 102, the image processing unit 103 and the image write unit 104 are connected to the image data control unit 100.

The image data control unit 100 performs, for example, following processing.

(1) Data compression processing (primary compression) for improving the bus transfer efficiency of the data;

(2) Transfer processing of the primary compression data to the image data;

(3) Image synthesis processing (it is possible to synthesize image data from a plurality of units, and also including synthesis on the data bus);

(4) Image shift processing (image shift in the horizontal scanning direction and vertical scanning direction);

(5) Image area extension processing (it is possible to extend the image area to the surroundings by an optional amount);

(6) Image variable power processing (for example, fixed variable power of 50% or 200%);

(7) Parallel bus interface processing;

(8) Serial bus interface processing (interface with a process controller 211 described later);

(9) Format conversion processing of parallel data and serial data;
(10) Interface processing with the image read unit 101; and
(11) Interface processing with the image processing unit 103.

The image read unit 101 performs, for example, following processing.
(1) Processing for reading light reflected on the original document by means of an optical system;
(2) Conversion processing to an electric signal by means of a CCD (Charge Couple Device);
(3) Digitalization processing by means of an A/D converter;
(4) Shading correction processing (processing for correcting illuminance distribution nonuniformity of a light source); and
(5) Scanner γ-correction processing (processing for correcting concentration characteristic of the read system).

The image memory control unit 102 performs, for example, following processing.
(1) Interface control processing with a system controller;
(2) Parallel bus control processing (interface control processing with a parallel bus);
(3) Network control processing;
(4) Serial bus control processing (control processing of a plurality of external serial ports);
(5) Internal bus interface control processing (command control processing with an operation section);
(6) Local bus control processing (access control processing of ROM, RAM, font data for activating the system controller);
(7) Operation control processing of a memory module (write/read control processing or the like of the memory module);
(8) Access control processing to the memory module (processing for adjusting memory access requests from a plurality of units);
(9) Data compression/expansion processing (processing for reducing data quantity for effectively utilizing a memory); and
(10) Image editing processing (data clear of the memory area, rotation processing of the image data, image synthesis processing on the memory or the like).

The image processing unit 103 performs, for example, following processing.
(1) Shading correction processing (processing for correcting illuminance distribution nonuniformity of a light source);
(2) Scanner γ-correction processing (processing for correcting concentration characteristic of the readout data).
(3) MTF correction processing;
(4) Smoothing processing;
(5) Optional variable power processing in the horizontal scanning direction;
(6) Concentration conversion (γ-conversion processing: corresponding to the concentration notch);
(7) Simple multi-valued processing;
(8) Simple binarization processing;
(9) Error diffusion processing;
(10) Dither processing;
(11) Dot arrangement phase control processing (dots leaning to the right, dots leaning to the left);
(12) Isolated point removal processing;
(13) Image area separation processing (color judgment, attribute judgement, adaptation processing); and
(14) Density conversion processing.

The image write unit 104 performs, for example, following processing.
(1) Edge smoothing processing (jaggie correction processing);
(2) Correction processing for rearrangement of dots;
(3) Pulse control processing of an image signal; and
(4) Format conversion processing of parallel data and serial data.

Figure 2:
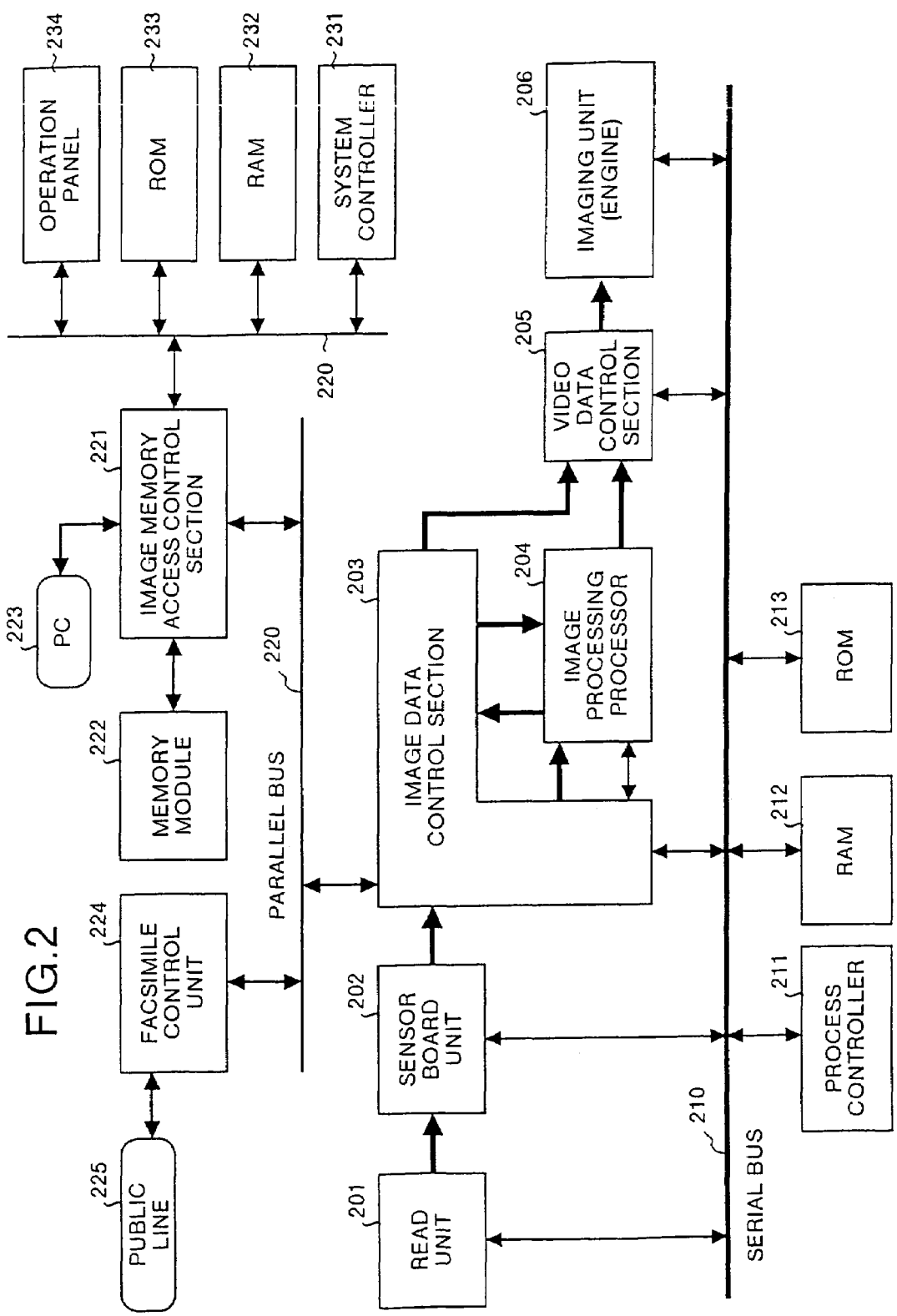
FIG. 2 is a block diagram which shows an example of the hardware configuration of an image processing apparatus according to the first embodiment.

The hardware configuration of the image processing apparatus according to the first embodiment will now be described. FIG. 2 is a block diagram showing one example of the hardware configuration of the image processing apparatus according to this embodiment.

This image processing apparatus according to this embodiment comprises a read unit 201, a sensor board unit 202, an image data control section 203, an image processing processor 204, a video data control section 205, and an imaging unit (engine) 206. The image processing apparatus according to this embodiment also comprises, via a serial bus 210, a process controller 211, a RAM 212 and a ROM 213.

Moreover, the image processing apparatus according to this embodiment comprises, via a parallel bus 220, an image memory access control section 221, a memory module 222, a facsimile control unit 224, and a system controller 231, RAM 232, ROM 233 and an operation panel 234 connected to the image memory access control section 221.

A relation between the components shown in FIG. 2 and those shown in FIG. 1 is as follows. That is, the function of the image read unit 101 shown in FIG. 1 is realized by the read unit 201 and the sensor board unit 202. The function of the image data control unit 100 is realized by the image data control section 203. The function of the image processing unit 103 is realized by the image processing processor 204.

The image write unit 104 is effectuated by the video data control section 205 and the imaging unit (engine) 206. Also the image memory control unit is effectuated by the image memory access control section 221 and the memory module 222.

The contents of each component will now be described. The read unit 201 for optically reading an original document comprises a lamp, a mirror and a lens, and the reflected light of the lamp irradiation with respect to the original document is gathered into a photodetector by means of the mirror and the lens.

The photodetector, for example, CCD is mounted on the sensor board unit 202, and the image data converted to electric signals in the CCD is converted to digital signals, and then output (transmitted) from the sensor board unit 202.

The image data output (transmitted) from the sensor board unit 202 is input (received) to the image data control section 203. The transmission of image data between the functional device (processing unit) and the data bus is controlled by the image data control section 203.

The image data control section 203 performs data transfer between the sensor board unit 202, the parallel bus 220 and the image processing processor 204 with respect to the image data, and communication between the process controller 211 the image data and the system controller 207 which performs overall control of the image processing apparatus. Moreover, the RAM 212 is used as a work area of the process controller 211 and the ROM 213 stores boot program or the like of the process controller 211.

The image data output (transmitted) from the sensor board unit 202 is transferred (transmitted) via the image data control section 203 to the image processing processor 204, to correct signal deterioration (signal deterioration of the scanner system) accompanying quantization with respect to the optical system and the digital signal, and is again output (transmitted) to the image data control section 203.

The image memory access control section 221 controls write and read of the image data with respect to the memory module, and also controls the operation of each component connected to the system parallel bus 220. Moreover, the RAM 232 is used as a work area of the system controller 231 and the ROM 233 stores boot program or the like of the system controller 211.

The operation panel 234 inputs processing to be performed by the image processing apparatus, for example, types of processing (copying, facsimile transmission, image read, printing or the like) and number of pages to be processed. Thereby, the image data control information can be input. The contents of the facsimile control unit 224 will be described later.

Thereafter, there are a job for accumulating the read out image data in the memory module 222 for reuse, and a job for not accumulating the image data in the memory module 222, and the respective cases will be described. As an example of the case to be accumulated in the memory module 222, there is a method wherein when one document is copied in a plurality of numbers, the read unit 201 is operated only once, and the image data read by the read unit 201 is accumulated in the memory module 222, to read the accumulated image data in a plurality of times.

As an example of not using the memory module 222, when one document is copied only once, since the read out image data is directly reproduced, the access by the image memory access control section 221 to the memory module 222 is not necessary.

At first, when the memory module 222 is not used, the data transferred from the image processing processor 204 to the image data control section 204 is returned again from the image data control section 203 to the image processing processor 204. In the image processing processor 203, an image quality processing by means of the CCD in the sensor board unit 202 is performed for converting the luminance data to the area gradation.

The image data after the image quality processing is transferred from the image processing processor 204 to the video data control section 205. The signal converted to the area gradation is subjected to post processing with regard to the dot arrangement and a pulse control for reproducing the dots, and thereafter, the reproduced image is formed on a transfer paper in the imaging unit 206.

Next, additional processing at the time of readout of the image accumulated in the memory module 222, for example, the image data flow will be described for the case where rotation of the image direction, synthesis of the image or the like is performed. The image data transferred from the image processing processor 204 to the image data control section 203 is transmitted from the image data control section 203 to the image memory access control section 221, via the parallel bus 220.

Here, access control of the image data and the memory module 222 based on the control of the system controller 231, development of the printing data by means of an external PC (personal computer) 223, and compression/expansion of image data for effectively utilizing the memory module 222 are performed.

The image data transmitted to the image memory access control section 221 is accumulated in the memory module 222 after data compression, and the accumulated image data is read out according to need. The read out image data is expanded, to return the data to the original image data, and returned from the image memory access control section 221 to the image data control section 203 via the parallel bus 220.

After the transfer of the image data from the image data control section 203 to the image processing processor 204, the image data is subjected to image quality processing and pulse control in the video data control section 205, to thereby form a reproduced image on a transfer paper in the imaging unit 206.

In the image data flow, the function of the digital compound machine is effectuated by bus control in the parallel bus 220 and the image data control section 203. The facsimile transmission function is to perform image processing with respect to the read out image data in the image processing processor 204, and transfer the image data to the facsimile control unit 224 via the image data control section 203 and the parallel bus 220. The image data is subjected to the data conversion to the communication network in the facsimile control unit 224, and transmitted as facsimile data to the public line (PN) 225.

On the other hand, with regard to the received facsimile data, the line data from the public line (PN) 225 is converted to the image data in the facsimile control unit 224, and is transferred to the image processing processor 204 via the parallel bus 220 and the image data control section 203. In this case, special image quality processing is not performed, and dot rearrangement and pulse control are performed in the video data control section 205 with respect to the image data, and a reproduced image is formed on a transfer paper in the imaging unit 206.

In a situation where a plurality of jobs, for example, the copying function, the facsimile transmission function, the printer output function operate in parallel, allocation of the right of use of the read unit 201, the imaging unit 206 and the parallel bus 220 to the plurality of jobs is controlled in the system controller 231 and the process controller 211.

The process controller 211 controls the image data flow, and the system controller 231 controls the entire system, and manages activation of each resource. Moreover, the function selection of the digital compound machine is input by the operation panel (operation section) 234, to thereby set up the processing contents such as copying function, facsimile function or the like.

The system controller 231 and the process controller 211 communicate with each other via the image data control section 203 and the serial bus 210. Specifically, by performing data format conversion for the data interface between the parallel bus 220 and the serial bus 210 in the image data control section 203, the communication between the system controller 231 and the process controller 211 is performed.

Figure 3:
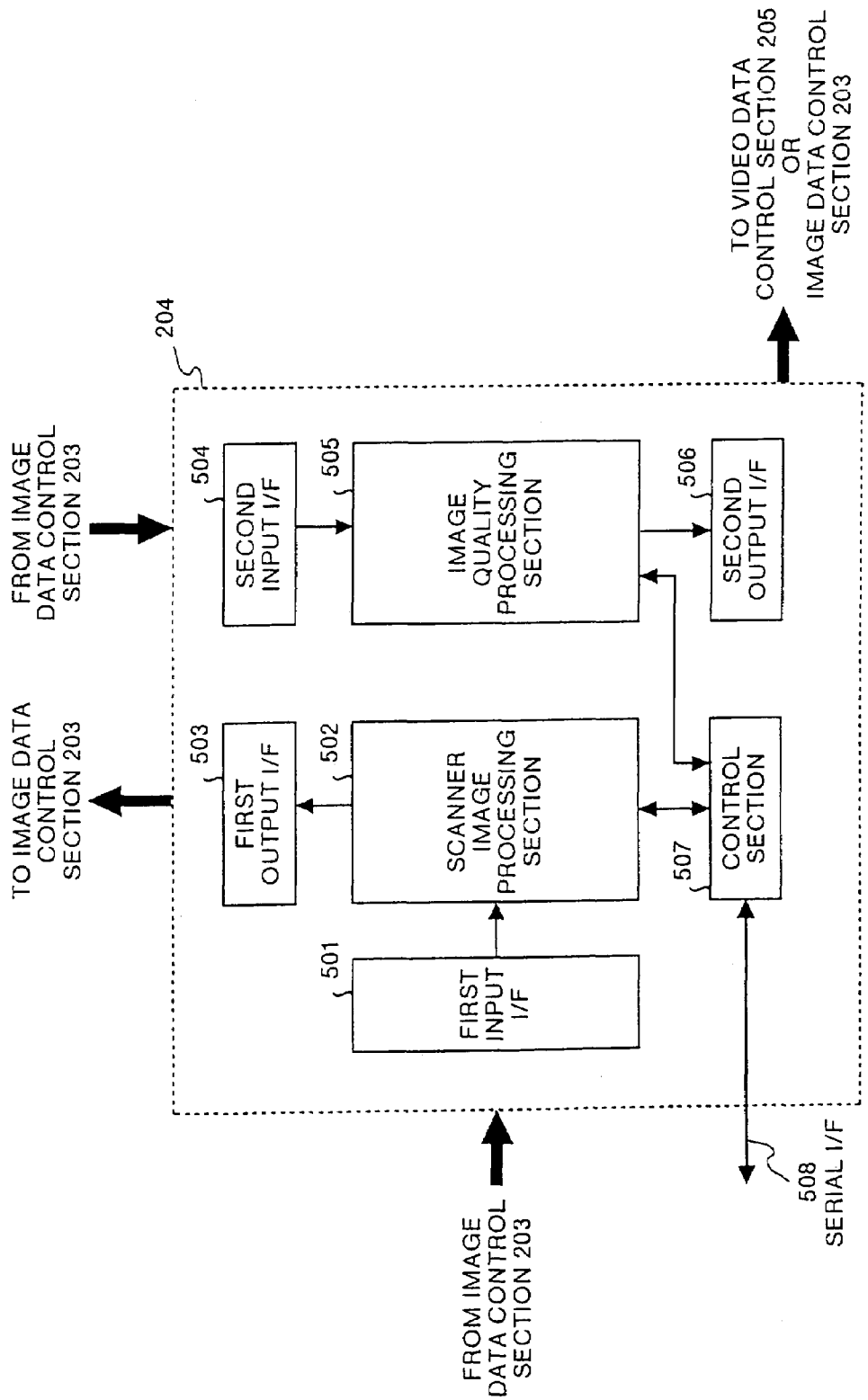
FIG. 3 is a block diagram which shows the outline of the processing of an image processing processor in an image processing apparatus according to the first embodiment.

The outline of the processing in the image processing processor 204 constituting the image processing unit 103 will now be described. FIG. 3 is a block diagram showing one example of the processing of the image processing processor 204 in the image processing apparatus according to the first embodiment.

The image processing processor 204 comprises a first input I/F 501, a scanner image processing section 502, a first output I/F 503, a second input I/F 504, an image quality processing section, and a second output I/F 506.

The read out image data is transmitted from the first input interface (I/F) 501 in the image processing processor 204 to the scanner image processing section 502 via the sensor board unit 202 and the image data control section 203.

The object thereof is to correct the deterioration in the read out image data, and specifically, shading correction, scanner γ-correction, MTF correction or the like is performed. Though not a correction processing, variable power processing of enlargement/reduction may be performed. When the correction processing with respect to the read out image data has been completed, the image data is transferred to the image data control section 203 via the first output interface (I/F) 503.

At the time of output onto the transfer paper, the image data from the image data control section 203 is received from the second input I/F 504, and subjects the image data to the area gradation processing in the image quality processing section 505. The image data, after having been subjected to the image quality processing, is output to the video data control section 205 or to the image data control section 203 via the second output I/F 506.

The area gradation processing in the image quality processing section 505 includes concentration conversion processing, dither processing, error diffusion processing and the like, and the main processing thereof is area approximation of the gradation information. Once the image data processed in the scanner image processing section 502 is accumulated in the memory module 222, various reproduced images can be ensured by changing the image quality processing by the image quality processing section 505.

For example, the mood of the reproduced image can be easily changed by waving (changing) concentration of the reproduced image or by changing the number of lines in the dither matrix. At this time, it is not necessary to re-read the image from the read unit 201 every time the processing is changed, and different processing can be rapidly performed for many times with respect to the same image data, by reading out the image data accumulated in the memory module 222.

The processing contents in the scanner image processing section 502 and the image quality processing section 505 can be programmably changed. Switching of the processing, change of the processing procedure or the like is controlled in the control section 507 via the serial I/F 508. Moreover, the control section 507 controls the write enable signal (timing of write enable), read enable signal (timing of read enable), the write clock rate and read clock rate of the FIFO memory described later.

In FIG. 3, for convenience' sake of explanation, the scanner image processing section 502 and the image quality processing section 505 are represented by separate blocks, but the actual data is processed by connecting a plurality of units comprising the SIMD type processor and the FIFO memory having the similar structure. Hence, it does not mean that the plurality of connected units have to be provided separately and independently in the scanner image processing section 502 and the image quality processing section.

Figure 4:
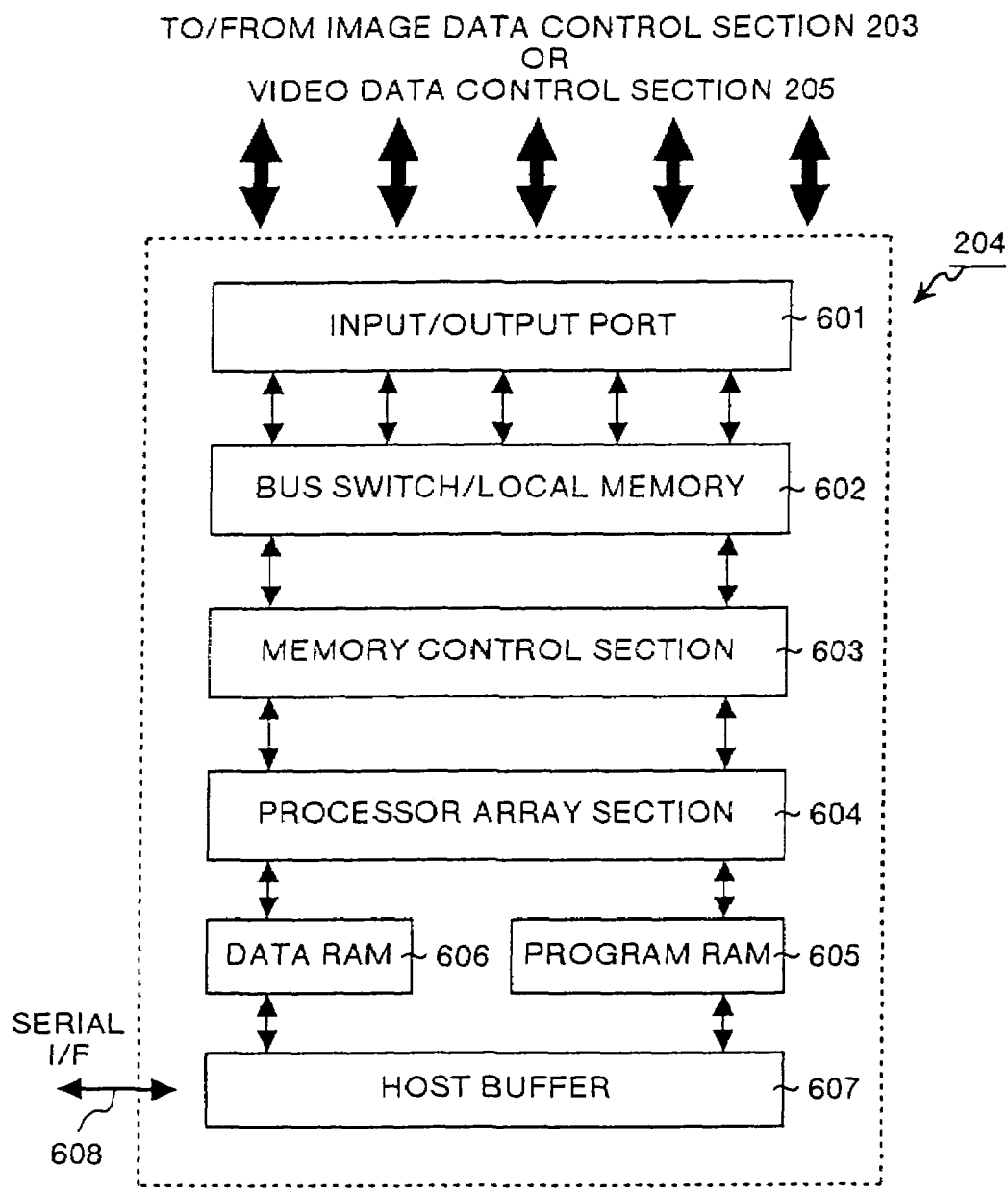
FIG. 4 is a block diagram which shows the internal construction of an image processing processor in an image processing apparatus according to the first embodiment.
Figure 5:
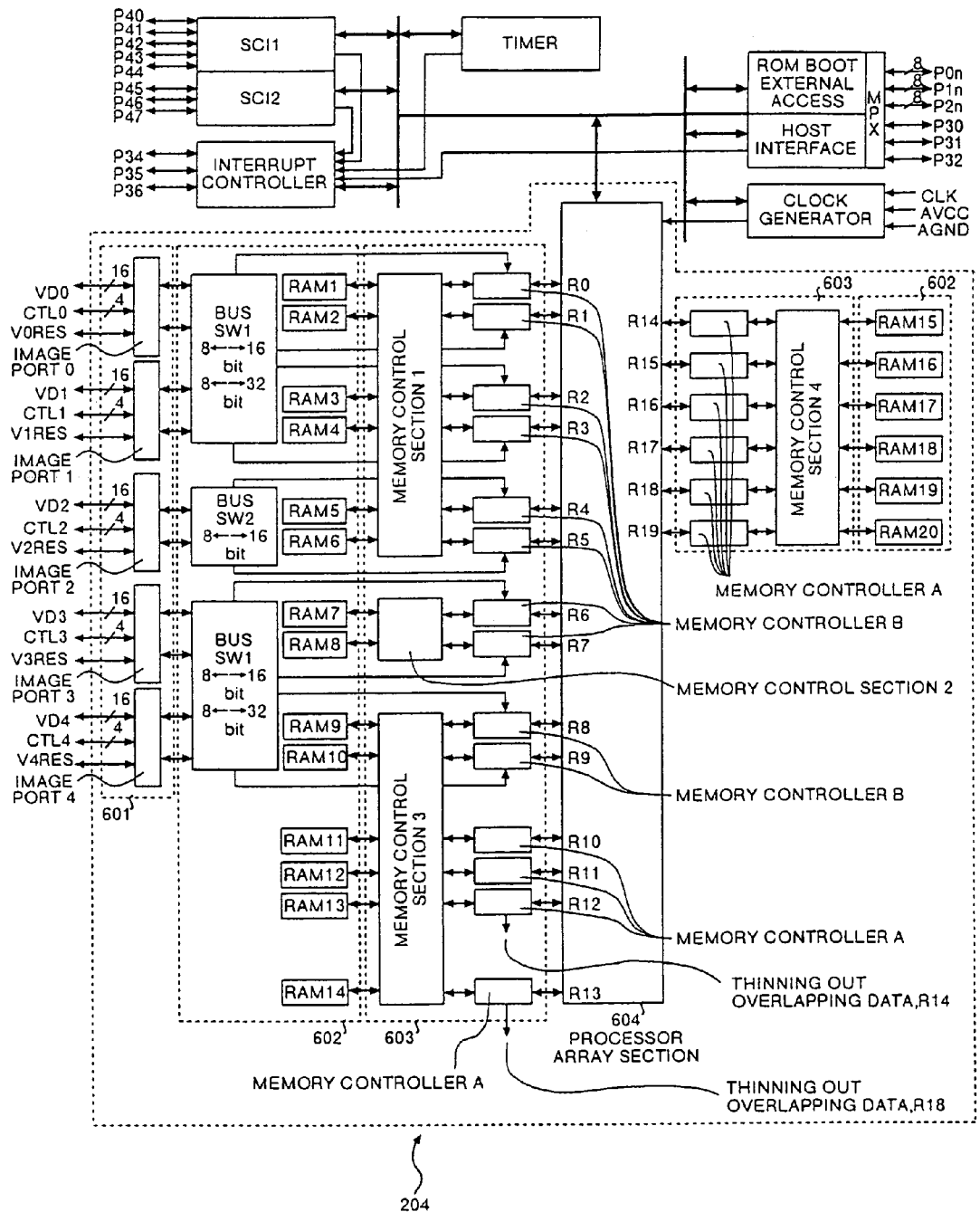
FIG. 5 is a schematic block diagram which shows the internal construction of an image processing processor in an image processing apparatus according to the first embodiment.

Next, internal construction of the image processing processor 204 will be explained. FIG. 4 is a block diagram showing the internal construction of the image processing processor 204 in the image processing apparatus according to this embodiment, and FIG. 5 is a schematic block diagram. The image processing processor is related to the data input/output with external equipment, and comprises a plurality of input/output ports (image ports) 601, and can optionally set the input and output of the data, respectively.

Moreover, the image processing processor comprises a bus switch/local memory group 602 therein for the connection with the input/output ports 601, and controls the memory area to be used and the route of the data path in the memory control section 603. For the input data and data to be output, the bus switch/local memory group 602 are allocated as a buffer memory for respectively storing these data and controlling I/F with the external equipment.

The image data stored in the bus switch/local memory group 602 undergoes various processing in a processor array section 604, and the output result (processed image data) is again stored in the bus switch/local memory group 602. The processing procedure of the processor, parameter for the processing or the like is transferred between program RAM 605 and data RAM 606.

The contents of the program RAM 605 and data RAM 606 are downloaded from the process controller 211 to a host buffer 607 via a serial I/F 608. The process controller 211 also reads the contents of the data RAM 606 and monitors the passage of the processing.

If the contents of the processing are changed, or the processing method is changed, contents in the program RAM 605 and data RAM 606 to which the processor array section 604 refers are updated to correspond to the change.

Figure 6:
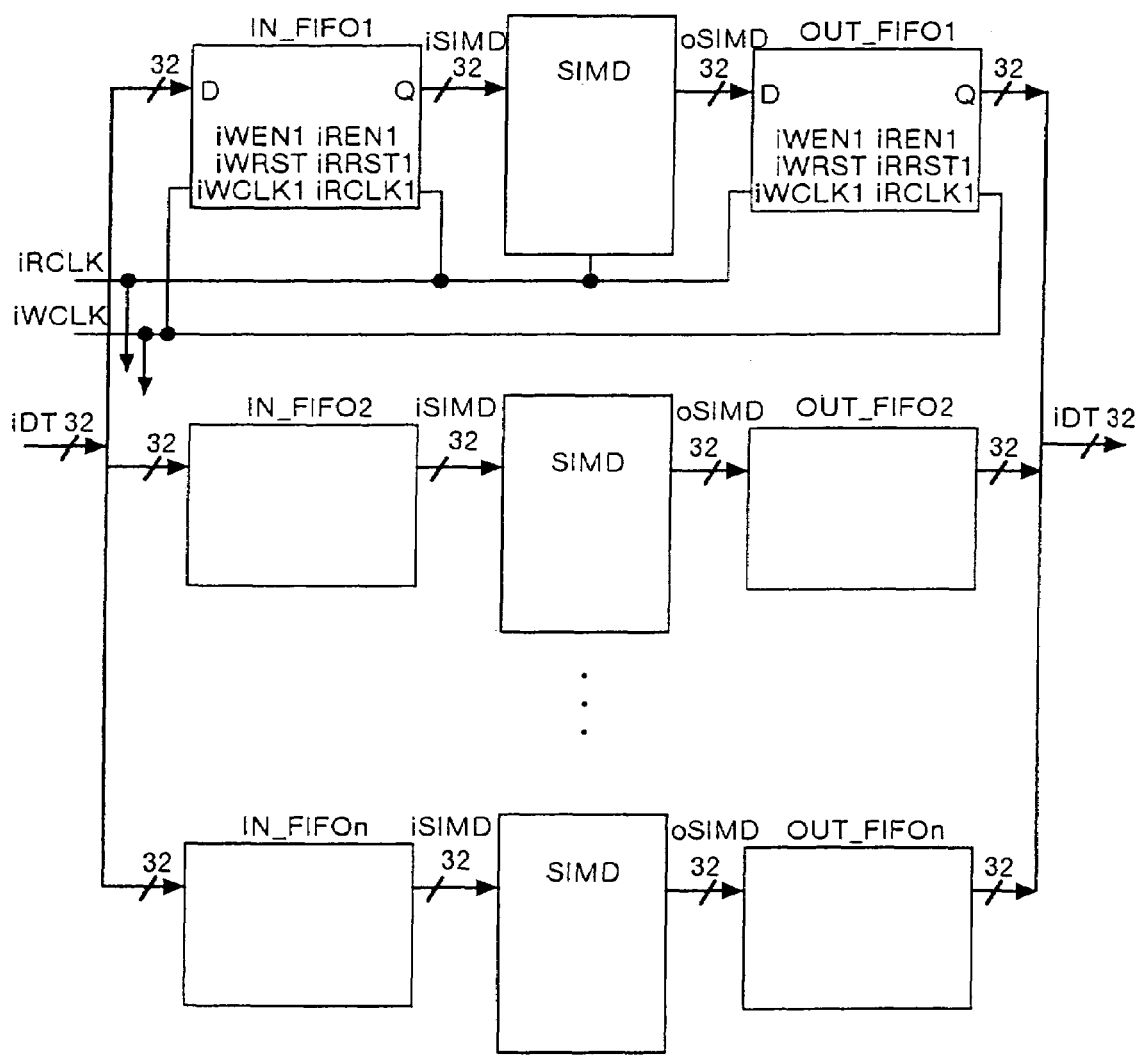
FIG. 6 is a schematic block diagram which shows a part of the schematic block diagram of the image processing processor shown in FIG. 5.

FIG. 6 is a schematic block diagram showing a part of the schematic block diagram of the image processing processor shown in FIG. 5. In FIG. 6, the local memory group in FIG. 5 is denoted as IN_FIFO with respect to the data input side, and as OUT_FIFO with respect to the data output side. Also, the processor array section 604 is represented as a set of the SIMD type processor.

As is clearly seen from the figure, the image data is processed by connecting a plurality of units comprising the SIMD type processor and the FIFO memory having the similar structure. However, the term, "unit" used herein does not mean that the unit is physically united, but does mean that it is used as a set in the passage of data processing.

Having a plurality of units enables such an operation that the image data having a length determined by setting is input from the input/output port 601, and is subjected to a desired image processing based on the control of the program, and the data after processing is output from the input/output port 601.

According to this embodiment, it is assumed that the pixel length that the SIMD type processor can read at a time is 8000 pixels having a length exceeding 7020 pixels which is the horizontal scanning length when A3 document is read at a pixel density of 600 dpi. Accordingly, when reading at 600 dpi, in principle, one SIMD type processor can perform the image processing.

The image processing apparatus according to this embodiment is constructed such that data having the horizontal scanning length exceeding 8000 pixels can be handled, by connecting a plurality of units comprising the SIMD type processor and the FIFO memory as shown in FIG. 6. iDT that is the input data of 32 bits is input to the FIFO memory IN_FIFO, and output to the SIMD type processor as iSIMD.

The data processed in the SIMD type processor is input to the FIFO memory OUT_FIFO as oSIMD and output as from OUT_FIFO as the output data oDT. IN_FIFO and OUT_FIFO are prepared for the number of SIMD type processors.

The SIMD type processor of the present invention has a detachable construction depending on the use mode. This is for enabling improvement in the processing speed of the entire image processing apparatus, by replacing the portion of the SIMD type processor, when the processing capability of the SIMD type processor is improved.

The improvement in the processing capability of the SIMD type processor becomes possible generally by improving the processing clock rate. Therefore, the processing clock rate of IN_FIFO or processing clock rate of OUT_FIFO is different from that of the SIMD type processor, and the SIMD type processor is generally faster.

The write clock rate (write speed) to IN_FIFO, iWCLK and the read clock rate (read speed) from OUT_FIFO, oRCLK are connected with a pixel clock sysclk (50 MHz) having the same clock rate as that of iDT. On the other hand, the read clock rate of IN_FIFO, iRCLK and the write clock rate of OUT_FIFO, oWCLK are connected with a pixel clock rate proclk (55 MHz) that is the processing clock rate of the SIMD type processor.

As for write enable signals, write reset signals, read enable signals and read reset signals of a plurality of IN_FIFO and OUT_FIFO, signals corresponding to each operation mode are generated in the control section 507 (see FIG. 3). Here, the memory connected to the SIMD type processor is the FIFO memory, but an image processing processor may be constructed by 2-port RAM or the like.

Figure 7:
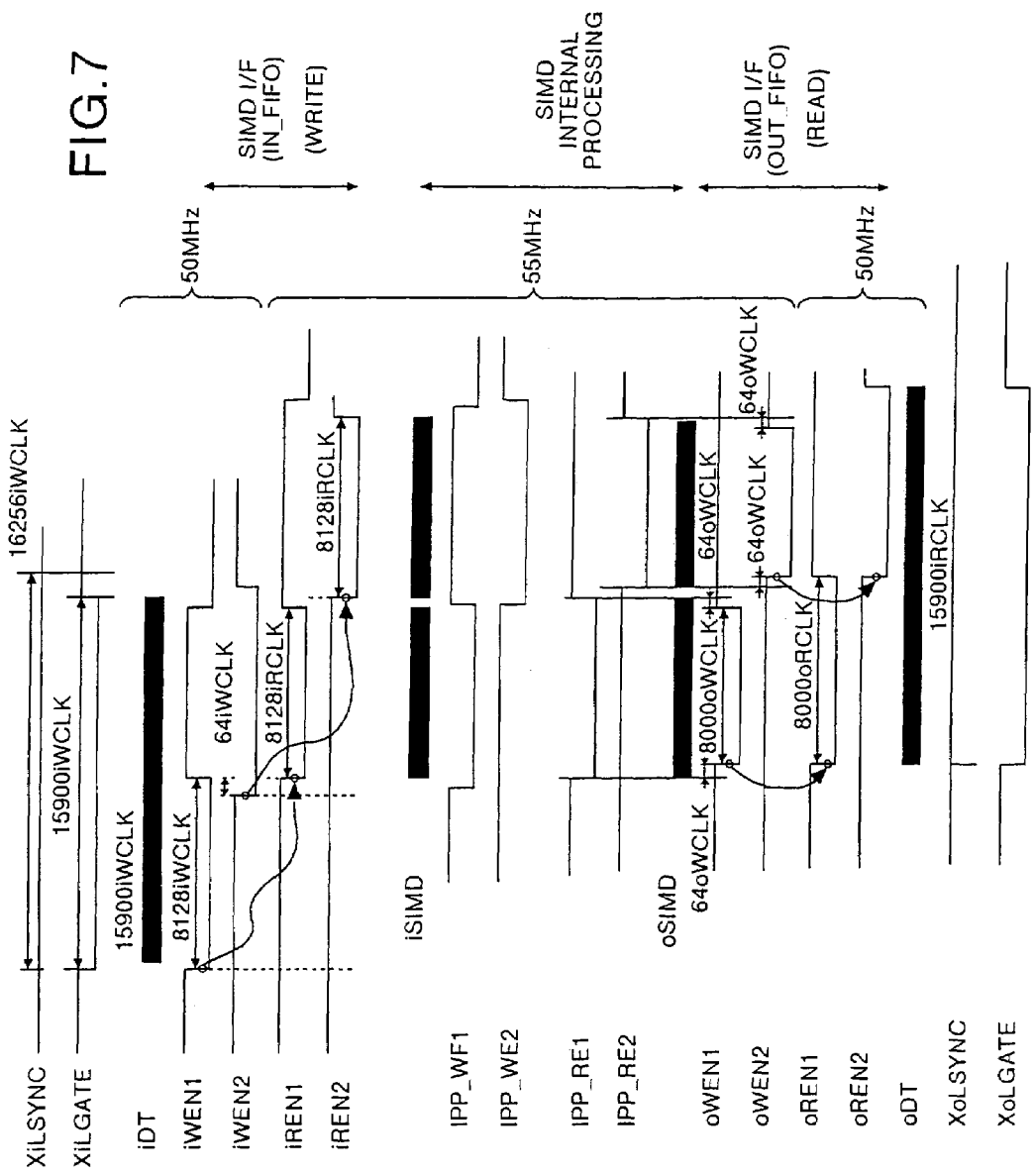
FIG. 7 is a timing chart which shows the sequence of processing performed by IN_FIFO, SIMD type processor and OUT_FIFO in the first embodiment.

The processing flow of IN_FIFO, SIMD type processor and OUT_FIFO will now be described with reference to a timing chart. FIG. 7 is a timing chart which shows the sequence of processing performed by IN_FIFO, SIMD type processor and OUT_FIFO.

Here, a description is given of an image processing apparatus which processes 15900 pixels by using two SIMD type processors capable of handling 8128 pixels. The basic idea is to increase the processible pixel length by dividing the image data, 15900 pixels, for one line in the horizontal scanning direction which is read by, for example, the read unit 201 (see FIG. 2) into two, to be processed by two SIMD type processors. In the case of a normal parallel processing, that is, when a certain image processing is performed without referring to other pixels, the image data input from iDT is simply divided and input to each IN_FIFO.

On the other hand, when a filtering processing such as error diffusion processing is performed, that is, such an algorithm is performed that the peripheral pixels are referred to for performing calculation, portions overlapping to each other become necessary at a joint of areas under charge of two SIMD type processors, in order to accurately perform arithmetic execution for the joint portion. Therefore, when the output of the arithmetic execution of 8000 pixels are required, in this example, 64 overlapping pixels are added to the front end and the rear end of the pixel to be processed. Hence, the write enable of IN_FIFO are generated for 8128 pixels.

The number of pixels (effective number of pixels) obtained by subtracting the number of peripheral pixels referred to for the target pixel from the number of pixels that can be image processed collectively by the SIMD type processor may be multiples of the number of rows or number of columns of the dither matrix. It is because since the joint of each effective pixel coincides with the change in the dither matrix, the dither processing operation can be smoothly performed, and the processing program can be simplified.

As described above, the clock rate at the time when the data is read from the IN_FIFO and handed over to the SIMD type processor so as to correspond to the processing speed of the SIMD type processor, is a clock rate faster than that of when IN_FIFO inputs iDT. In this example, write to the IN_FIFO is performed at 50 MHz, and readout from OUT_FIFO is performed at 55 MHz.

The data handed over to the SIMD type processor is divided by 8128 pixel unit and transmitted. The SIMD type processor reads the data by SIMD_WE1, SIMD_WE2 which are write enable of the processor. After a predetermined operation (image processing) is performed in the SIMD type processor, readout is performed by SIMD_RE1, SIMD_RE2 which are read enable of the processor.

The data oSIMD read out from the SIMD type processor has 8128 pixels added with the overlapping portion (64 pixels×2=128 pixels) in addition to the effective pixels. Therefore, oWEN (write enable) is generated at a timing cutting off only 8000-pixels of the effective portions (portions not overlapped).

Write enable and write reset are generated so that two FIFOs are operated by a toggle. Readout is performed at the input pixel clock (pixel clock of iDT=50 MHz), and OREN (read enable) is controlled so that the output data from each OUT_FIFO is connected to thereby obtain the final oDT.

As for the gate signal, a signal added with a delay in the gate signal in the SIMD type processor and the interface section thereof is generated as XoLSYNC, XoLGATE, with respect to the gate signal of the input data, XiLSYNC, XiLGATE. In the case of the timing of this FIFO memory, after write of the input data to the FIFO memory has been completed, read is performed. Therefore, the length of the FIFO memory is required to be equal to or longer than the number of pixels processed by the SIMD type processor (8128 pixels).

Figure 8:
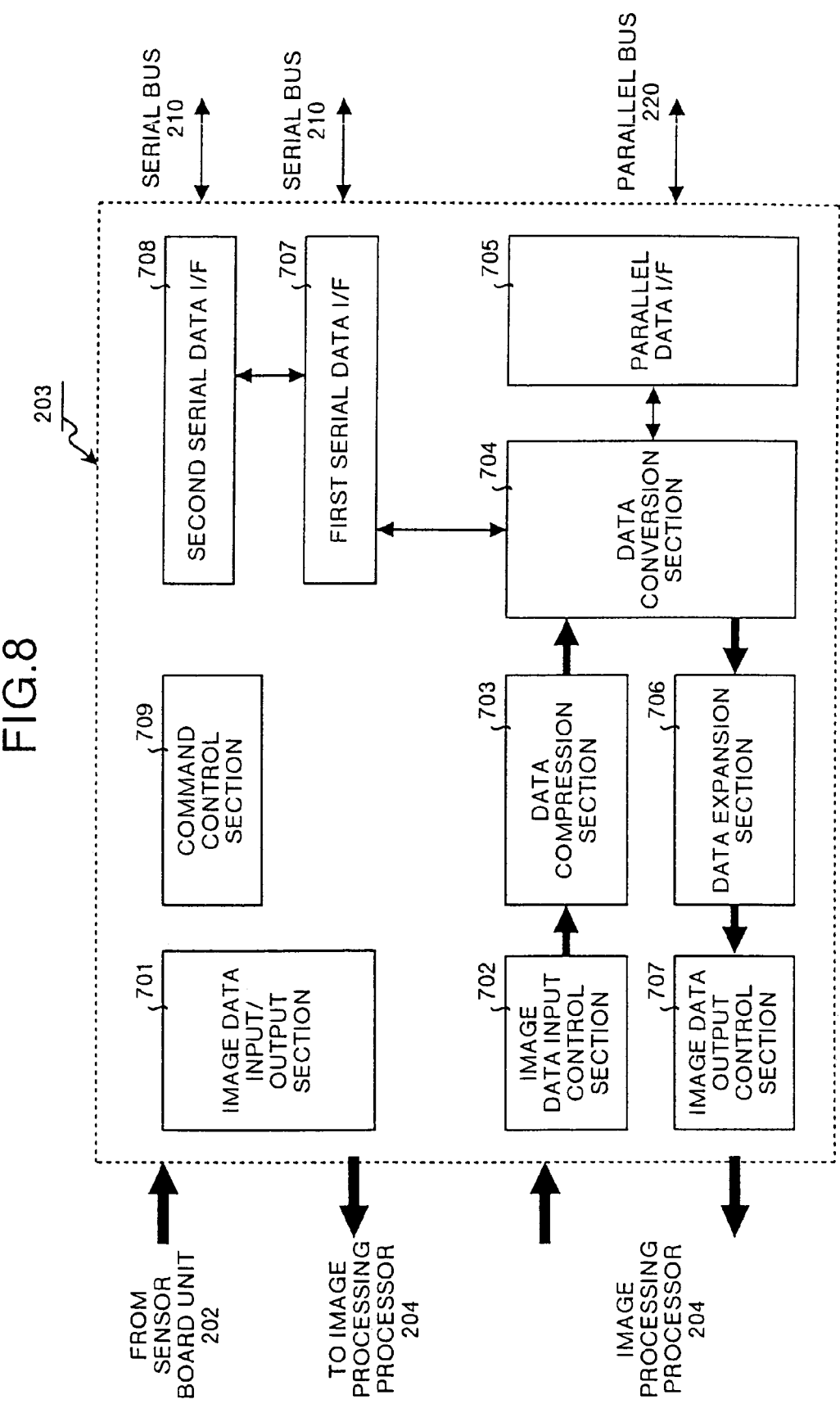
FIG. 8 is a block diagram which shows the outline of processing of an image data control section in the image processing apparatus according to the first embodiment.

Outline of the processing in the image data control section 203 constituting the image data control unit 100 will now be described. FIG. 8 is a block diagram showing the outline of processing of the image data control section image data control section 203 in the image processing apparatus according to this embodiment.

As shown in FIG. 8, the image data input/output section 701 inputs (receives) the image data from the sensor board unit 202, and outputs (transmits) the image data to the image processing processor 204. That is to say, the image data input/output section 701 is a component for connecting the image read unit 101 and the image processing unit 103 (image processing processor 204), and it can be said that the image data input/output section 701 is a dedicated input/output section only for transmitting the image data read by the image read unit 101 to the image processing unit 103.

The image data input control section 702 inputs (receives) the image data having subjected to the scanner image correction in the image processing processor 204. The input image data is subjected to the data compression processing in the data compression section 703 for increasing the transfer efficiency in the parallel bus 220. Thereafter, the image data is transmitted to the parallel bus 220 via the parallel data I/F 705, through the data conversion section 704.

The image data input via the parallel data I/F 705 from the parallel bus 220 is transmitted to the data expansion section 706 through the data conversion section 704, since it is compressed for bus transfer, and then is subjected to the data expansion processing. The expanded image data is transferred to the image processing processor 204 in the image data output control section 707.

The image data control section 203 also comprises a conversion function between the parallel data and the serial data. The system controller 231 transfers data to the parallel bus 220, and the process controller 211 transfers data to the serial bus 210. The image data control section 203 performs data conversion for the communication between two controllers.

The serial data I/F comprises a first serial data I/F 707 for exchanging data with the process controller via the serial bus 210, and a second serial data I/F 708 used for exchange of data with the image processing processor 204. By having one system independently between the serial data I/F and the image processing processor 204, the interface with the image processing processor 204 can be made smooth.

The command control section 709 controls the operation of each component in the above-described image data control section 203 and each interface according to the input command.

Figure 9:
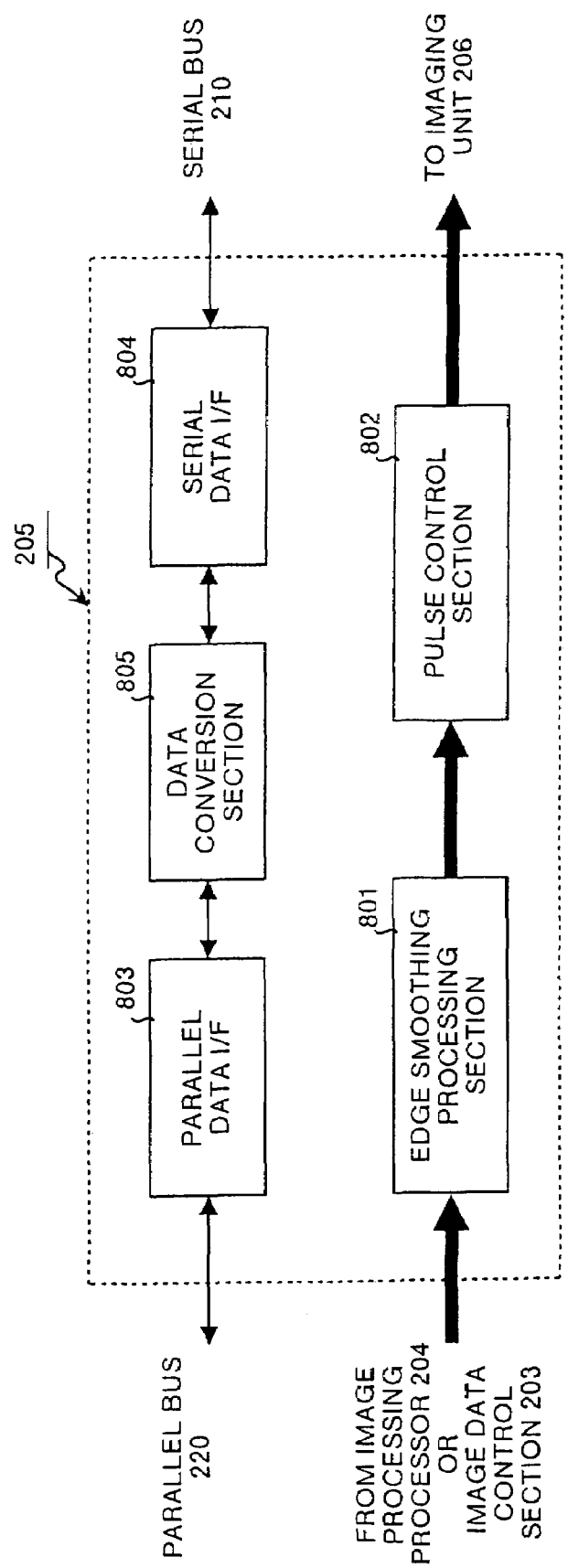
FIG. 9 is a block diagram which shows the outline of processing of video data of the image processing apparatus according to the first embodiment.

Outline of the processing in the video data control section 205 constituting a part of the image write unit 104 will now be described. FIG. 9 is a block diagram showing the outline of processing of video data of the image processing apparatus according to the first embodiment.

As shown in FIG. 9, the video data control section 205 performs additional processing depending on the characteristic of the imaging unit 206, with respect to the input image data. That is to say, an edge smoothing processing section 801 performs dot rearrangement processing by means of an edge smoothing processing, and a pulse control section 802 performs pulse control of the image signal for forming dots, and the image data having subjected to the above processing is output to the imaging unit 206.

Independently of the conversion of image data, the video data control section 205 has a format conversion function of parallel data and serial data, so that even a single unit of the video data control section 205 can correspond to communication between the system controller 231 and the process controller 211. That is to say, the video data control section 205 comprises a parallel data I/F 803 for transferring parallel data, a serial data I/F 804 for transferring serial data, and a data conversion section 805 for converting data received by the parallel data I/F 803 and the serial data I/F 804 to each other, to thereby convert the format of the both data.

Figure 10:
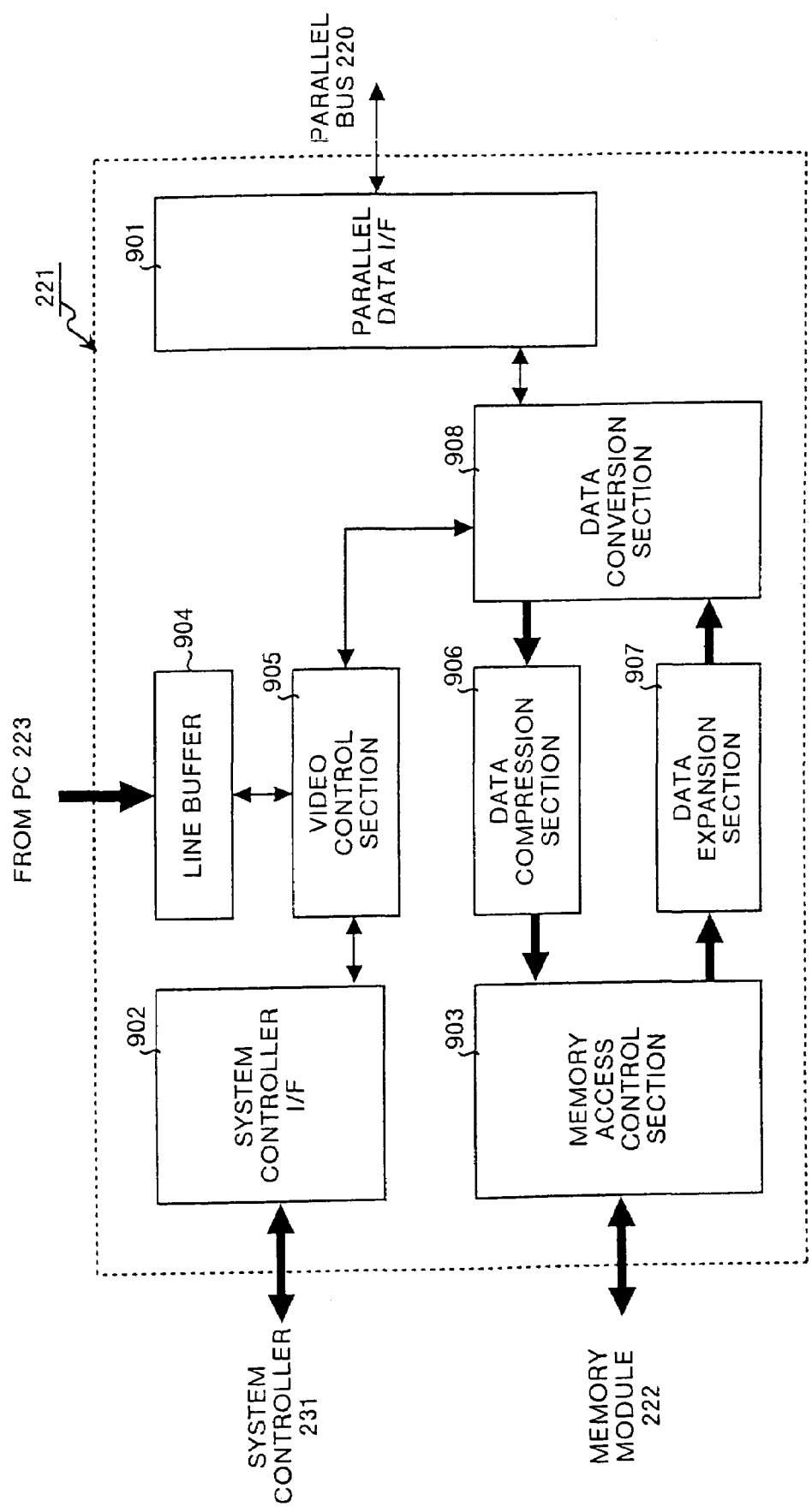
FIG. 10 is a block diagram which shows the outline of processing of an image memory access control section in the image processing apparatus according to the first embodiment.

Outline of the processing in the image memory access control section 221 constituting a part of the image memory control unit 102 will now be described. FIG. 10 is a block diagram showing the outline of processing of the image memory access control section 221 in the image processing apparatus according to this embodiment.

As shown in FIG. 10, the image memory access control section 221 manages the interface of the image data with the parallel bus 220, controls the access of the image data to the memory module 222, that is, storage (write)/readout, and control the development of code data input mainly from external PCs to the image data.

Therefore, the image memory access control section 221 has a construction comprising a parallel data I/F 901, a system controller I/F 902, a memory access control section 903, a line buffer 904, a video control section 905, a data compression section 906, a data expansion section 907, and a data conversion section 908.

Here, the parallel data I/F 901 manages the interface of the image data with the parallel bus 220. The memory access control section 903 controls the access of the image data to the memory module 222, that is, storage (write)/readout.

The input rode data is stored in the local area by the line buffer 904. The code data stored in the line buffer 904 is developed to the image data in the video control section 905, based on the development processing command input from the system controller 231 via the system controller I/F 902.

The developed image data or the image data input from the parallel bus 220 via the parallel data I/F 901 is stored in the memory module 222. In this case, the image data to be stored is selected in the data conversion section 908, and subjected to data compression to increase the efficiency of memory use in the data compression section 906, and the image data is stored (written) in the memory module 222, while the addresses in the memory module 222 are controlled in the memory access control section 903.

As for readout of the image data stored (accumulated) in the memory module 222, the address to be read is controlled in the memory access control section 903, and the read image data is expanded in the data expansion section 907. When the expanded image data is transferred to the parallel bus 220, data transfer is performed via the parallel data I/F 901.

Figures 11, 12:
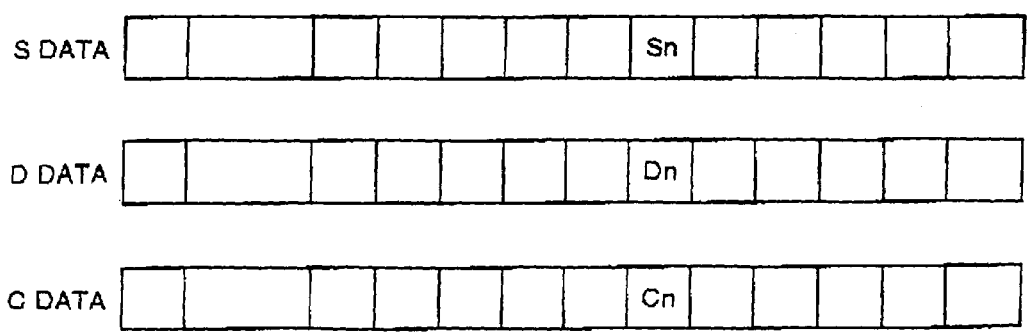
FIG. 11 is a diagram which shows the outline of a scanner (an example of a spatial filter) in the image processing apparatus according to the first embodiment.
FIG. 12 is a diagram which shows the outline of shading correction of the image processing apparatus according to the first embodiment.

Contents of the image processing in the image processing apparatus according to this embodiment will now be described. FIG. 11 is a diagram showing the outline of a scanner (an example of a spatial filter) in the image processing apparatus according to this embodiment. MTF correction function is realized by a construction of the special filter.

As shown in FIG. 11, when the two-dimensional special filter is constructed including filter coefficients of from A to Y, filtering processing is performed with respect to the input image data with the same arithmetic execution processing to all images. For example, when the special filtering processing is performed centering on the input image data (i row, j column), the operation processing with the corresponding coefficient is performed with respect to the image in the i row, j column, respectively. The pixel in (i, j) is subjected to the arithmetic execution with the coefficient value M, and the pixel in (i, j+1) is subjected to the arithmetic execution with the coefficient value N. The calculation result in the filter matrix is output as the processing result of the target pixel (i, j).

When the target pixel is (i, j+1), the pixel in (i, j+1) is subjected to the arithmetic execution with the coefficient value M, and the pixel in (i, j+2) is subjected to the arithmetic execution with the coefficient value N, and the calculation result in the filter matrix is output as the processing result of the target pixel (i, j+1).

The processing is such that the input image data is different, and the parameter for processing is common. In this spatial filtering processing, the value of coefficient values A to Y is not fixed, and may be optionally changed depending on the characteristic of the input image, and desired image quality. Otherwise, the flexibility of the image processing function may not be ensured.

Execution by the image processing processor 204 is performed by downloading the coefficient value by the process controller, and can correspond to changes in the system by changing the contents of the data to be loaded, even if the construction of the read unit is changed and the characteristic in read image deterioration is changed. The parallel processing of the image processing processor 204 will be described in detail.

Figure 13:
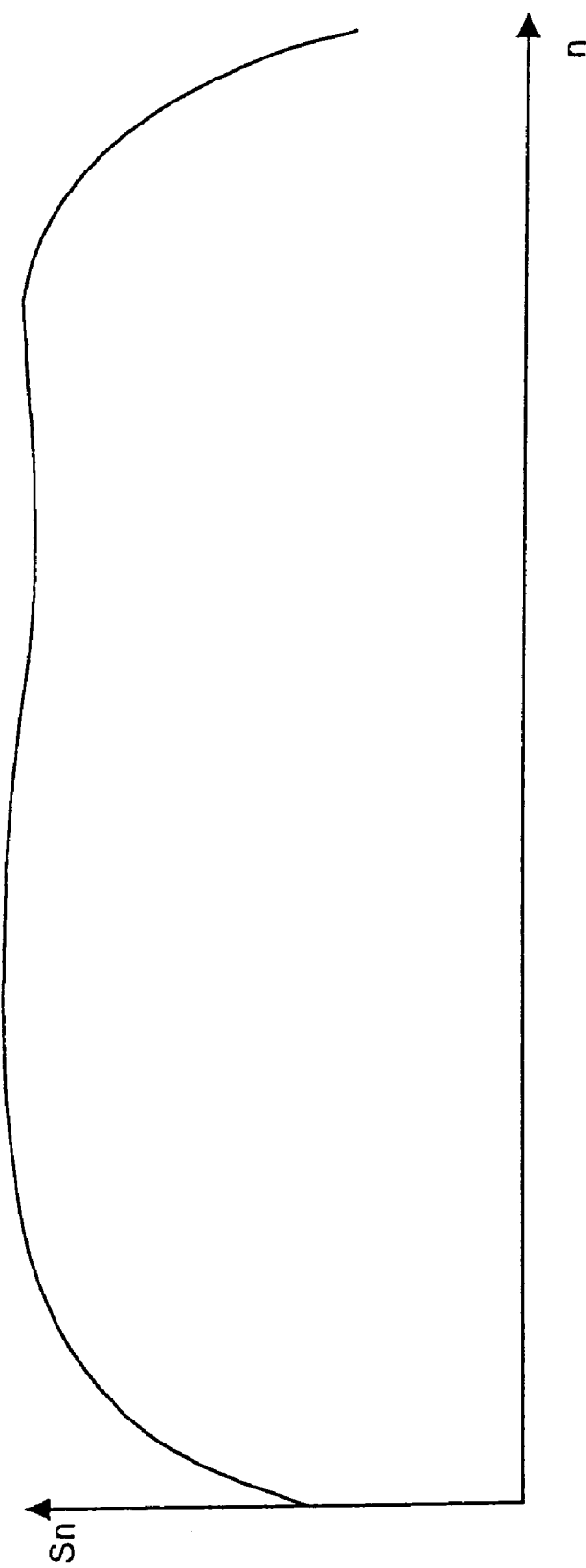
FIG. 13 is a diagram which shows the outline of shading data in the image processing apparatus according to the first embodiment.

FIG. 12 is a diagram showing the outline of shading correction of the image processing apparatus according to this embodiment. FIG. 13 is a diagram showing the outline of shading data in the image processing apparatus according to this embodiment. The shading correction is for correcting the nonuniformity of the reflected light characteristic based on the illuminance distribution of an illumination system, wherein a reference white board having uniform concentration is read before readout of the document, to form reference data for shading correction, and based on the shading data, normalization of reflection distribution depending on the read position of the read image is performed.

As shown in FIG. 13, the shading data has different reflection distribution depending on the document read position n. At the end portion of the document read position, the white board having uniform concentration is read dark.

Sn shows a white board read signal level at the read position n, and it shows that as the Sn becoming large, brighter is the white board read.

The shading correction is to correct the light quantity distribution nonuniformity of the lamp by executing the processing of the same content to the respective read image data, with respect to the data depending on the position. The S data shown in FIG. 12 is the shading data formed by the white board read shown in FIG. 13. The D data shown in FIG. 12 is the read data of each read line. Also, n shows the read position.

C data is data after the D data has been subjected to the shading correction, and normalized as:

$$Cn = A = (Dn/Sn)$$

where A is a normalization coefficient.

In the image processing processor 204, S data is stored in the local memory, and correction operation is performed between corresponding Dn and Sn with respect to the input D data.

Figure 14:
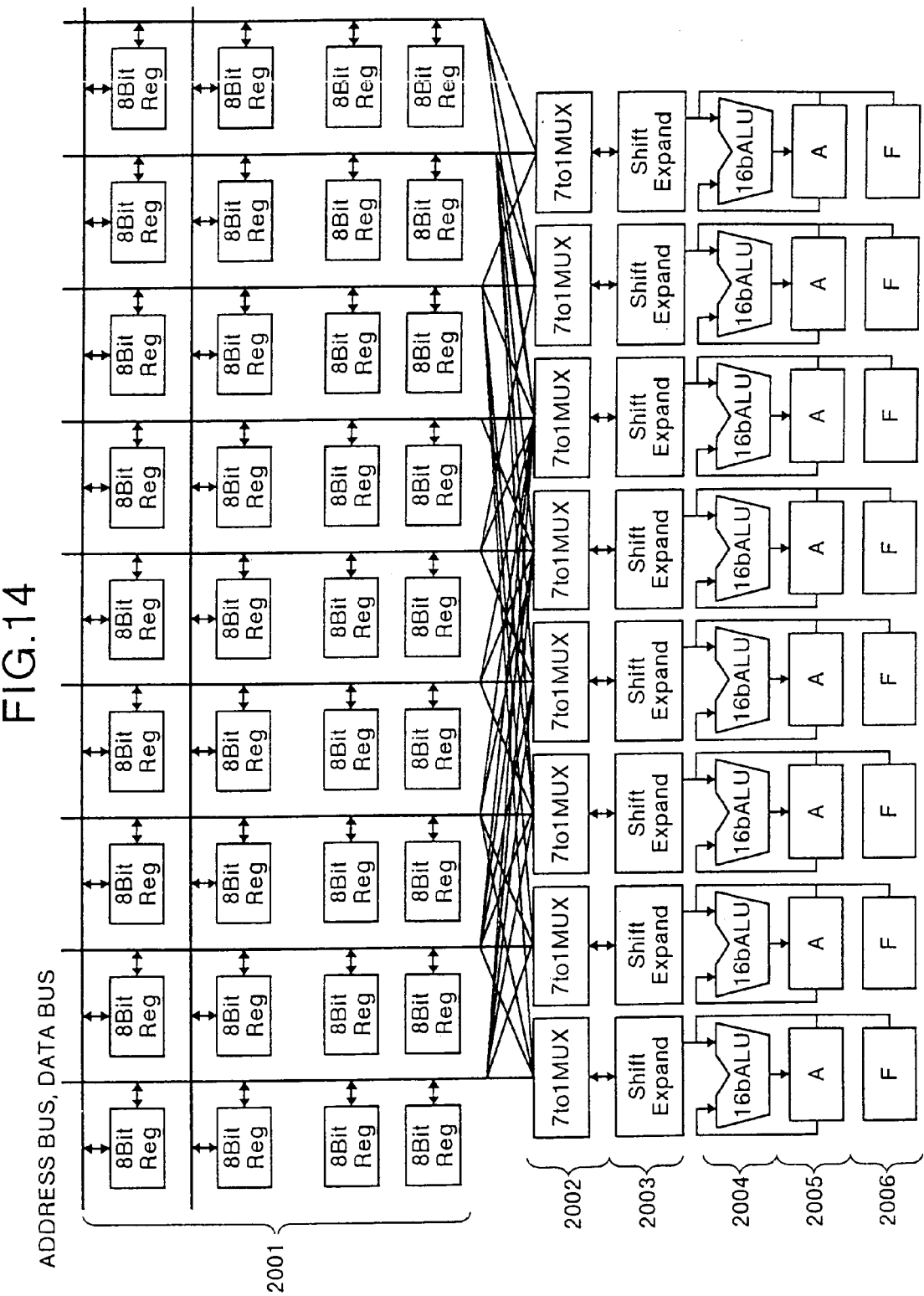
FIG. 14 is a diagram which shows the schematic construction of a SIMD type processor used the image processing apparatus according to the first embodiment.

FIG. 14 is a diagram showing the schematic construction of a SIMD type processor. SIMD (Single Instruction stream Multiple Data stream) is for executing a single command in parallel with respect to a plurality of data, and comprises a plurality of PE (processor element). This SIMD type processor is provided in a prescribed location in the processor array section 604 in FIG. 4 or FIG. 5.

Each PE comprises a register (Reg) 2001 for storing data, a multiplexer (MUX) 2002 for accessing other PE registers, a barrel shifter (Shift Expand) 2003, an arithmetic logic unit (ALU) 2004, an accumulator (A) 2005 for storing the logic result, and a temporary register (F) 2006 for temporarily putting aside the contents of the accumulator.

Each register 2001 is connected to the address bus and data bus (lead and word line), for storing command codes for prescribing the processing and data to be processed. The contents of the register 2001 are input to the arithmetic logic unit 2004 and the operation processing results are stored in the accumulator 2005. In order to take out the results to the outside of PE, the results are temporarily put aside in the temporary register 2006. By taking out the contents of the temporary register 2006, the processing result with respect to the data to be processed can be obtained.

The command codes having the same content are given to each PE, and data to be processed is given to each PE in a different condition. The operation results are processed in parallel and output to each accumulator 2005, by referring to the contents in the register 2001 of the neighboring PE in the multiplexer 2002.

For example, if the contents in one line of the image data are arranged in PE for each pixel, and are subjected to the arithmetic execution processing with the same command code, the processing result for one line can be obtained in a shorter period of time than in the case where sequential processing is performed for one pixel. In particular, with the spatial filtering processing and shading correction processing, processing can be performed commonly to all PEs, with the command code to each PE being arithmetic expression itself.

As described above, the image processing apparatus according to this embodiment uses a plurality of operation processors having a general-purpose memory of a fixed length connected for performing, for example, processing of pixels in one line in the horizontal scanning direction. Hence, by performing image processing in a system which realizes multi-functions, high-speed image processing can be performed, wherein the development efficiency is improved.

Moreover, since the FIFO memory is provided and controlled so as to become read enable and write enable at an appropriate timing, even if image processing referring to other pixels is performed, high-speed parallel processing can be contemplated, by processing overlapping pixels having a certain length.

Moreover, even if the processing clock rate of the SIMD type processor is different from that of the FIFO memory, image processing is possible, and high-speed processing can be contemplated. Effective utilization of respective resources related to the image processing of the system which realizes multi-functions can be contemplated, thereby enabling high-speed image processing wherein the development efficiency is improved.

In the above-described first embodiment, the input/output FIFO memory requires a value larger than the number of pixels to be processed in the SIMD type processor. However, in the second embodiment described below is a case wherein high-speed image processing is realized, even if the FIFO memory has a capacity smaller than the number of pixels to be processed in the SIMD type processor. In the second embodiment, description of the parts common to the first embodiment is omitted, and only parts different from those in the first embodiment are described. Also in the drawing, the parts similar to those in the first embodiment are denoted by the same reference symbols.

Figure 15:
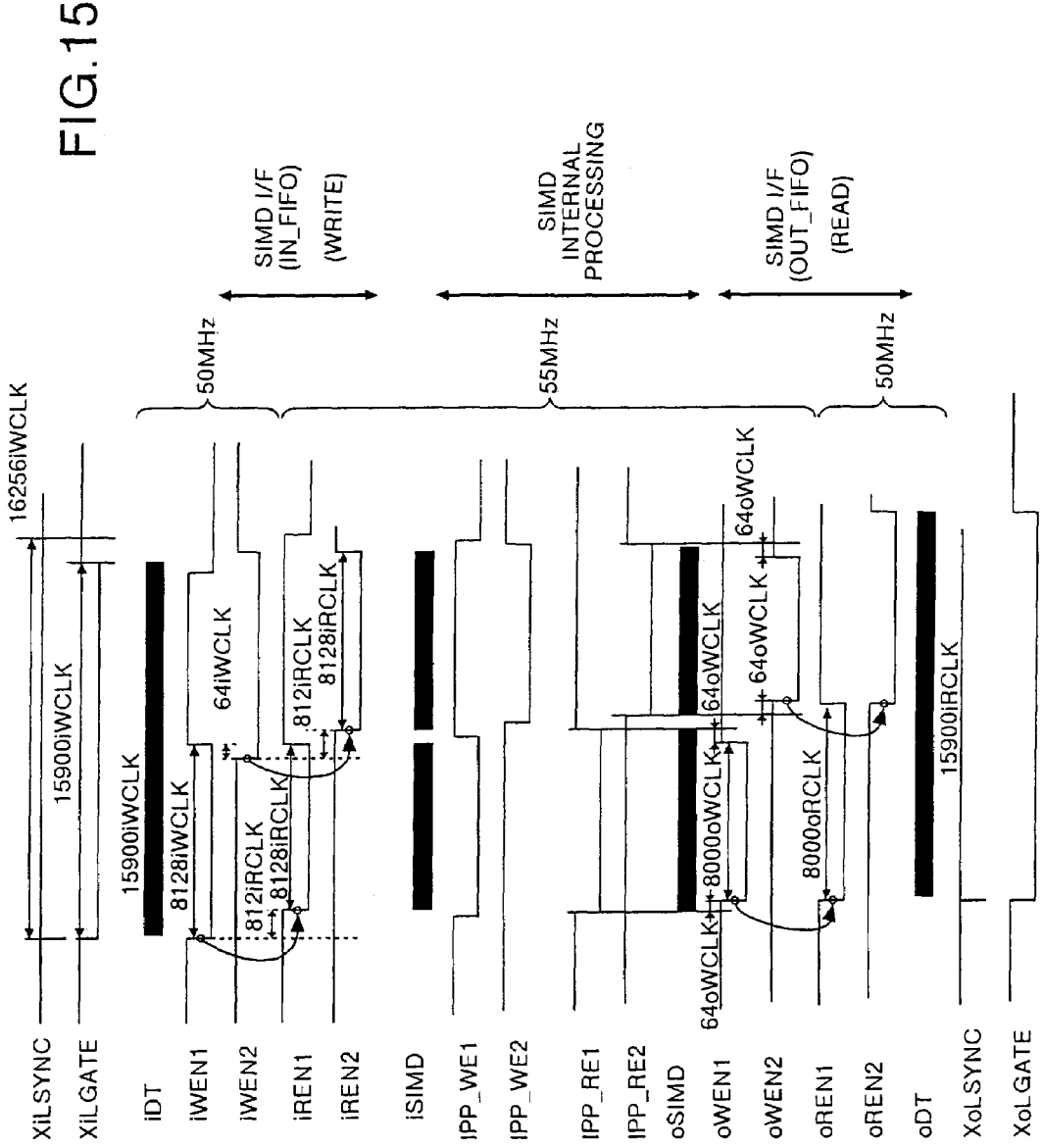
FIG. 15 is a timing chart which shows the sequence of processing performed by IN_FIFO, SIMD type processor and OUT_FIFO in a second embodiment.

FIG. 15 is a timing chart showing the processing flow in the image processing processor of an image processing apparatus in the second embodiment. In this second embodiment, the point that the input data iDT is processed for every 15900 pixels, being a unit in the horizontal scanning direction, and written in IN_FIFO for 8128 pixels at a clock rate of 50 MHz including the overlapped portion is the same as in the case of the first embodiment.

Readout is performed after all the data is written in the FIFO memory in the first embodiment. However, in the second embodiment, readout is started before write is completed. The clock rate of the written data is 50 MHz, and the clock rate of readout is 55 MHz.

Therefore, the read speed is faster than the write speed, but if it is assumed that the FIFO memory has a capacity for holding 813 pixels (8128×5/50=812.8), the readout address does not get ahead of the write address, by performing control for starting the readout after data more than 813 pixels have been accumulated (have been written).

That is, even if the FIFO memory has a capacity smaller than the capacity that can be batch-processed by the SIMD type processor, the whole image processing processor does not have to be modified by performing timing control of read and write of the FIFO memory.

Moreover, in general, since the FIFO memory performs constant buffering, a certain time lag occurs in the later processing operation. Therefore, as the capacity of the FIFO memory becomes smaller, higher processing speed can be obtained. Accordingly, as in the present invention, with the improvement in the processing speed of the SIMD type processor, even if the FIFO memory has relatively insufficient capacity, the more is improved in the whole processing speed. Alternatively, by making the FIFO memory small intentionally, and making the SIMD type processor high speed, it is possible to contemplate improvement in the processing speed synergistically.

The data input/output of the OUT_FIFO on the output side is opposite to the input side, and data input to the OUT_FIFO is performed at 55 MHz, and data output is performed at 50 MHz. Accordingly, the readout address does not get ahead of the write address.

However, since the read speed is slower, it is necessary to accumulate data before being read in the FIFO memory. As described above, if 8128 pixels are handled, OUT_FIFO requires a length that can accumulate data of 813 pixels or more. The delay in the input with respect to the gate signal is effected by a desired amount in the gate delay block as described in claim 1.

The image processing apparatus in the second embodiment can perform high-speed image processing as a whole, in such a manner that even if the processing speed of the SIMD type processor is higher than the write speed to the IN_FIFO and read speed from OUT_FIFO, the SIMD type processor can sufficiently exert high-speed processing capability, by controlling a predetermined write timing or read timing, and the FIFO memory can reduce occurrence of time lag by decreasing the capacity thereof.

A third embodiment provides an image processing apparatus that can cover longer horizontal scanning direction with smaller number of SIMD type processors. Again, description of parts common to those in the first or second embodiments is omitted, and only parts different from those in the first or second embodiments is described. Also in the drawing, the parts similar to those in the first or second embodiment are denoted by the same reference symbols.

Figure 16:
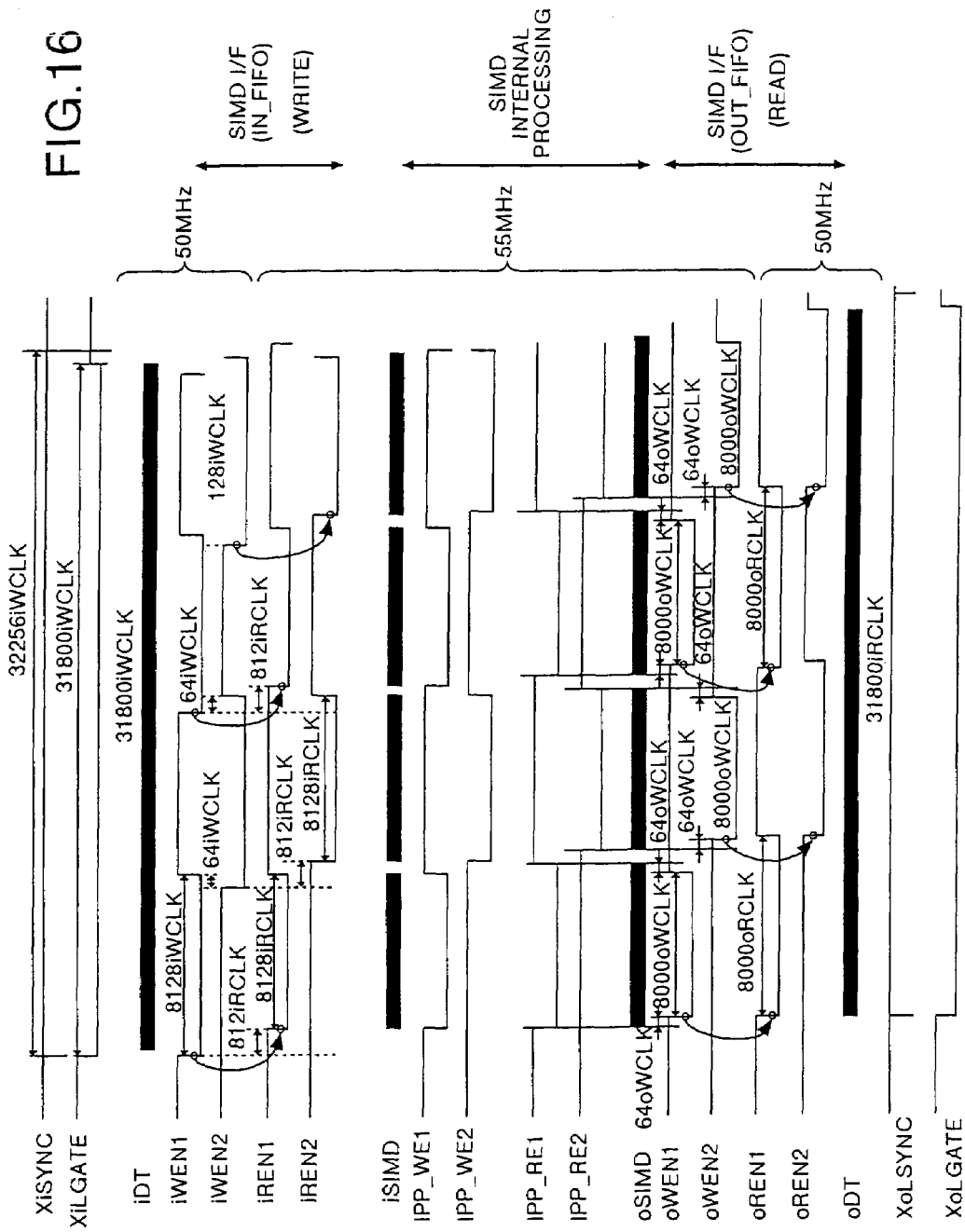
FIG. 16 is a timing chart which shows the sequence of processing performed by IN_FIFO, SIMD type processor and OUT_FIFO in a third embodiment.

FIG. 16 is a timing chart showing the processing operation of an image processing processor which performs batch processing of images up to 31800 pixels by using two SIMD type processors repeatedly twice. The basic timing of write enable and read enable is the same as in the second embodiment, and a timing is adopted that can interface with a FIFO memory having a capacity shorter than 8128 pixels, being the batch processing length of the SIMD type processor.

The two SIMD type processors are designated as SIMD type processor 1 and SIMD type processor 2, respectively. The SIMD type processor 1 processes data 1 of 8128 pixels from the top. The processing of data 2 of the next 8128 pixels including an overlap of 64 pixels is performed by the SIMD type processor 2.

When the data 1 of the next 8128 pixels comes in, the SIMD type processor 1 has already completed processing, hence the SIMD type processor 1 is reused for the processing of data 1. Also, when the data 2 of the next 8128 pixels comes in, the SIMD type processor 2 has already completed processing, hence the SIMD type processor 2 is reused for the processing of data 2.

In the third embodiment, it is possible to perform image processing by using the SIMD type processors repeatedly, without replacing the image processing processor, even if the number of pixels increases, gathering in the horizontal scanning direction which is required to be batch-processed, in the read unit 201 or the like in FIG. 2, and becomes longer than the batch processing length of the prepared SIMD type processor.

A fourth embodiment provides an image processing apparatus wherein the overlap quantity at the time of connecting images in the respective SIMD type processors described in the first, second or third embodiments can be changed.

Normally, the required minimum overlap quantity changes depending on the contents of processing performed in the SIMD type processor. For example, if a filter processing is required for 9 pixels which refers to 5 pixels on both sides of the target pixel, the overlap is required for at least 5 pixels. If this is for the algorithm in which wider range has to be referred to, such as image area separation, the overlap quantity has to be increased.

On the other hand, in order to ensure the overlap quantity with a margin, more pixels have to be processed for the margin, hence the processing clock rate becomes high more than necessary. This leads to increase of power consumption and cost up, since a measure against EMI (Electromagnetic Interference) should be performed more than necessary. As a result, such a control is desirable that the number of overlaps is increased when it is necessary at any cost.

Figure 17:
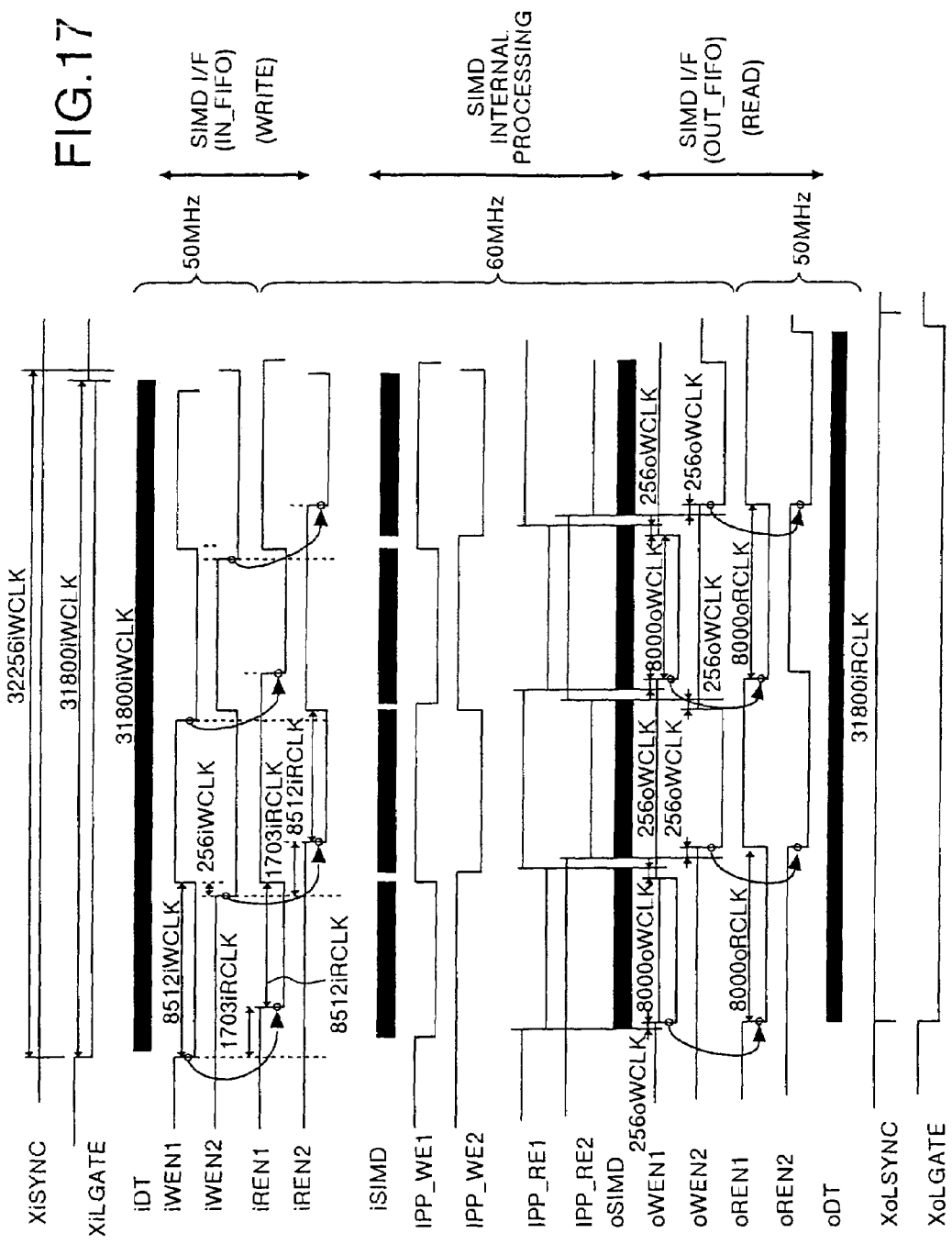
FIG. 17 is a timing chart which shows the sequence of processing performed by IN_FIFO, SIMD type processor and OUT_FIFO in a fourth embodiment.
Figure 18:
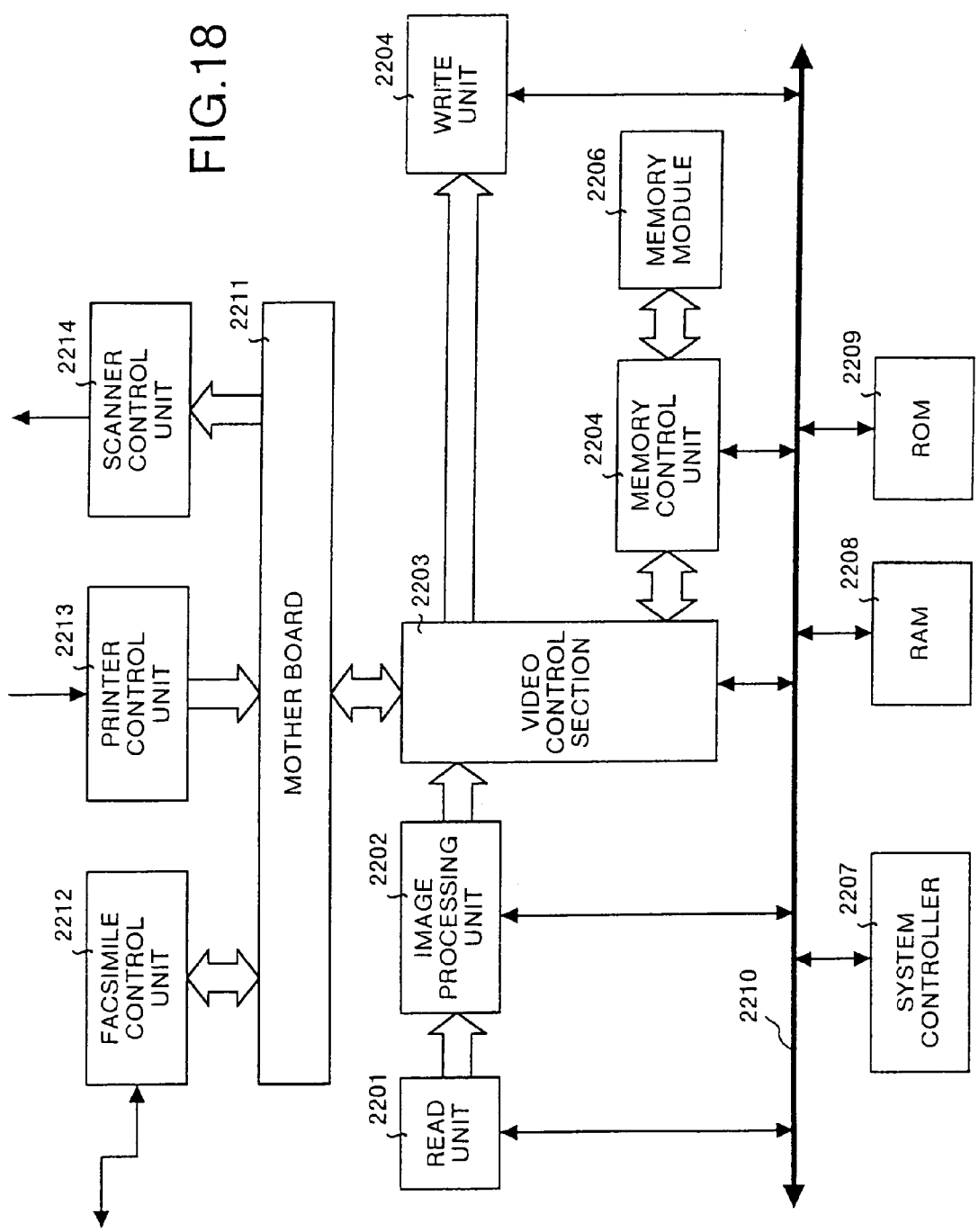
FIG. 18 is a block diagram showing the hardware configuration of a conventional digital compound machine.

FIG. 17 is a timing chart when the overlap pixels become 256 pixels. Since the number of overlap pixels increases, and 512 pixels are necessary on both sides, the number of pixels input/output to the FIFO memory becomes 8512 pixels. The data of this number of pixels is read from the FIFO memory at a speed of 60 MHz faster than before. In-between blocks of data are not overlapped and handed over to the SIMD type processor. It is necessary for the SIMD type processor to process 8512 pixels, and hence the SIMD type processor receives data at a clock rate of 60 MHz, and performs internal processing.

The timing of the FIFO memory or the like which inputs or outputs at a clock rate of 60 MHz used herein is required to be changed depending on the number of pixels to be overlapped. If the overlap quantity is small, the number of pixels to be processed decreases, and hence the clock rate also decreases. On the contrary, if the overlap quantity is large, the clock rate increases.

The data whose processing is completed is output from the SIMD type processor at the same clock rate of 60 MHz, and 256 pixels of the overlap are cut off in the OUT_FIFO. Subsequently, effective data of 8000 pixels are connected and output at a clock rate of 50 MHz, to become oDT.

In the fourth embodiment, the clock rate of the SIMD type processor and the timing of each FIFO memory are changed depending on the processing contents, thereby enabling reduction of power consumption and radiation field.

As described above, according to the present invention, even if the memory capacity of the image processing unit (image processing processor) is relatively insufficient, the image processing processor can be effectively utilized. As a result, an image processing apparatus which can perform image processing at high-speed can be realized.

The present document incorporated by reference the entire contents of Japanese priority document, 11-306014 filed in Japan on Oct. 27, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus which refers to peripheral pixels of a target pixel to perform processing of said target pixel, said image processing apparatus comprising:
   an input I/F memory configured to read pixels having a predetermined length, subject these pixels to buffering, and write these pixels in a SIMD type processor;
   a SIMD type processor configured to perform batch processing of the pixels from said input I/F memory so as to provide batch processed pixels;
   an output I/F memory configured to read the processed pixels, subject the processed pixels to buffering, and write the pixels in a predetermined output destination; and a control unit configured to control read and/or write time of said input I/F memory and said output I/F memory, wherein an effective number of pixels obtained by subtracting the number of peripheral pixels from the number of batch processed pixels is a multiple of the number of rows or columns of a dither matrix and an integer.

2. An image processing apparatus comprising:

an input I/F memory configured to read pixels having a predetermined length, subject these pixels to buffering, and write these pixels in a SIMD type processor;

a SIMD type processor configured to perform processing of the pixels from said input I/F memory to provide processed pixels;

an output I/F memory configured to read the processed pixels, subject the processed pixels to buffering, and write the pixels in a predetermined output destination; and a control unit configured to control read and/or write time of said input I/F memory and said output I/F memory, wherein said SIMD type processor is physically detachable from said input I/F memory or said output I/F memory.

3. An image processing apparatus comprising:

an input I/F memory configured to read pixels having a predetermined length at a first speed, subject these pixels to buffering, and write the pixels in a SIMD type processor at a second speed, the second speed being faster than the first speed;

a SIMD type processor configured to perform batch processing of the pixels written from said input I/F memory so as to provide batch processed pixels;

an output I/F memory configured to read the batch processed pixels from said SIMD type processor at a third speed, subject the batch processed pixels to buffering, and write the batch processed pixels in a predetermined output destination at a fourth speed, the fourth speed being slower than the third speed; and a control unit configured to control read and/or write time of said input I/F memory and said output I/F memory and control the first, second, third, and/or fourth speed.

4. The image processing apparatus according to claim 3, wherein said control unit controls the write and/or read time to thereby use said input I/F memory and output I/F memory a plurality of times.

5. The image processing apparatus according to claim 3, wherein said SIMD type processor is physically detachable from said input I/F memory or said output I/F memory.

6. An image processing apparatus comprising:

an input I/F memory configured to read pixels having a predetermined length at a first speed, subject the pixels to buffering, and write the pixels in a SIMD type processor at a second speed, the second speed being faster than the first speed;

a SIMD type processor configured to perform batch processing of the pixels written from said input I/F memory so as to provide batch processed pixels, the size of the batch processed pixels being larger than the size of the input I/F memory;

an output I/F memory configured to read the batch processed pixels at a third speed, subject the batch processed pixels to buffering, and write the batch processed pixels in a predetermined output destination at a fourth speed, the fourth speed being slower than the third speed and the size of the batch processed pixels being larger than the size of the output I/F memory; and a control unit configured to control the first and/or second speed, and write and/or read time of said input I/F memory based on said first and/or second speed and the size of said input I/F memory, and/or control the third and/or fourth speed, and write and/or read time of said output I/F memory based on said third and/or fourth speed, and the size of said output I/F memory.

7. The image processing apparatus according to claim 6, wherein said control unit controls the write and/or read time to thereby use said input I/F memory and output I/F memory a plurality of times.

8. The image processing apparatus according to claim 6, wherein said SIMD type processor is physically detachable from said input I/F memory or said output I/F memory.

* * * * *